(12) United States Patent
Karnik et al.

(10) Patent No.: US 11,135,546 B2
(45) Date of Patent: Oct. 5, 2021

(54) GRAPHENE BASED FILTER

(71) Applicants: Massachusetts Institute of Technology, Cambridge, MA (US); King Fahd University of Petroleum & Minerals, Dhahran (SA)

(72) Inventors: Rohit N. Karnik, Cambridge, MA (US); Sean C. O'Hern, Cambridge, MA (US); Michael S. H. Boutilier, Cambridge, MA (US); Cameron A. Stewart, Barrie (CA); Harold S. Au, Cambridge, MA (US); Nicolas G. Hadjiconstantinou, Medford, MA (US); Tahar Laoui, Dhahran (SA); Muataz A. Atieh, Dhahran (SA)

(73) Assignees: Massachusetts Institute of Technology, Cambridge, MA (US); King Fahd University of Petroleum & Minerals, Dhahran (SA)

( * ) Notice: Subject to any disclaimer, the term of this patent is extended or adjusted under 35 U.S.C. 154(b) by 844 days.

(21) Appl. No.: 13/835,173

(22) Filed: Mar. 15, 2013

(65) Prior Publication Data

US 2013/0270188 A1    Oct. 17, 2013

Related U.S. Application Data

(60) Provisional application No. 61/611,067, filed on Mar. 15, 2012.

(51) Int. Cl.
*B01D 53/22* (2006.01)
*B01D 71/50* (2006.01)
(Continued)

(52) U.S. Cl.
CPC ....... *B01D 53/228* (2013.01); *B01D 67/0062* (2013.01); *B01D 69/02* (2013.01);
(Continued)

(58) Field of Classification Search
None
See application file for complete search history.

(56) References Cited

U.S. PATENT DOCUMENTS 3,839,201 A   10/1974  Miller
3,980,456 A    9/1976  Browall
(Continued)

FOREIGN PATENT DOCUMENTS

CN    102574071 A    7/2012
DE    102010001504 A1    8/2011
(Continued)

OTHER PUBLICATIONS

Water Transport through Ultrathin Graphene, Myung E. Suk and N. R. Aluru, The Journal of Physical Chemistry Letters 2010 1 (10).*
(Continued)

*Primary Examiner* — Jason M Greene
*Assistant Examiner* — Eric J McCullough
(74) *Attorney, Agent, or Firm* — Wolf, Greenfield & Sacks, P.C.

(57) ABSTRACT

Two-dimensional material based filters, their method of manufacture, and their use are disclosed. The filters may include at least one active layer disposed on a porous substrate. The at least one active layer may include intrinsic and/or intentional formed pores. In some embodiments, the flow resistance of the porous substrate may be selected to limit flow through defects and intrinsic pores in the at least one active layer.

44 Claims, 17 Drawing Sheets

(51) Int. Cl.

| | | |
|---|---|---|
| *B01D 69/12* | (2006.01) | |
| *B01D 71/02* | (2006.01) | |
| *B01D 69/02* | (2006.01) | |
| *C02F 1/44* | (2006.01) | |
| *B01D 67/00* | (2006.01) | |
| *G01N 15/08* | (2006.01) | |

(52) U.S. Cl.
CPC ............. *B01D 69/12* (2013.01); *B01D 71/02* (2013.01); *B01D 71/021* (2013.01); *B01D 71/50* (2013.01); *C02F 1/44* (2013.01); *G01N 15/082* (2013.01); *B01D 2325/20* (2013.01); *G01N 2015/084* (2013.01)

(56) References Cited

U.S. PATENT DOCUMENTS

| | | | |
|---|---|---|---|
| 4,337,154 A * | 6/1982 | Fukuchi | B01D 69/125 210/490 |
| 4,767,422 A | 8/1988 | Bikson et al. | |
| 4,894,160 A * | 1/1990 | Abe | B01D 46/2422 210/510.1 |
| 5,510,176 A * | 4/1996 | Nakamura | B01D 71/36 428/316.6 |
| 5,645,891 A * | 7/1997 | Liu | B01D 67/0044 427/376.2 |
| 5,672,388 A | 9/1997 | McHenry et al. | |
| 6,117,341 A | 9/2000 | Bray et al. | |
| 6,730,145 B1 | 8/2004 | Li | |
| 8,361,321 B2 | 1/2013 | Stetson et al. | |
| 8,376,100 B2 | 2/2013 | Avadhany et al. | |
| 9,324,995 B2 | 4/2016 | Ryhanen et al. | |
| 9,505,192 B2 | 11/2016 | Stoltenberg et al. | |
| 9,901,879 B2 | 2/2018 | Karnik et al. | |
| 9,997,778 B2 | 6/2018 | Cao et al. | |
| 10,668,435 B2 | 6/2020 | Karnik et al. | |
| 2002/0088748 A1 | 7/2002 | Allcock et al. | |
| 2003/0185741 A1 | 10/2003 | Matyjaszewski et al. | |
| 2006/0201884 A1 | 9/2006 | Kulprathipanja et al. | |
| 2007/0017861 A1* | 1/2007 | Foley | B01D 53/228 210/500.27 |
| 2007/0256562 A1 | 11/2007 | Routkevitch et al. | |
| 2008/0020197 A1 | 1/2008 | Ayers et al. | |
| 2008/0149561 A1* | 6/2008 | Chu | A61L 15/425 210/500.38 |
| 2009/0000651 A1 | 1/2009 | Qiao | |
| 2009/0120874 A1 | 5/2009 | Jensen et al. | |
| 2009/0155678 A1 | 6/2009 | Less et al. | |
| 2009/0321355 A1* | 12/2009 | Ratto | B01D 67/0079 210/651 |
| 2010/0212504 A1* | 8/2010 | Shimizu | B01D 53/228 96/13 |
| 2011/0056892 A1 | 3/2011 | Strauss et al. | |
| 2011/0139707 A1 | 6/2011 | Siwy et al. | |
| 2011/0223494 A1 | 9/2011 | Feaver et al. | |
| 2012/0000845 A1 | 1/2012 | Park et al. | |
| 2012/0048804 A1 | 3/2012 | Stetson et al. | |
| 2012/0108418 A1 | 5/2012 | Nair et al. | |
| 2012/0171376 A1 | 7/2012 | Dodge | |
| 2012/0186980 A1 | 7/2012 | Mishra et al. | |
| 2012/0255899 A1 | 10/2012 | Choi et al. | |
| 2012/0295091 A1 | 11/2012 | Behabtu et al. | |
| 2013/0040283 A1 | 2/2013 | Star et al. | |
| 2013/0105417 A1 | 5/2013 | Stetson et al. | |
| 2013/0192460 A1 | 8/2013 | Miller et al. | |
| 2013/0192461 A1 | 8/2013 | Miller et al. | |
| 2013/0305927 A1 | 11/2013 | Choi et al. | |
| 2013/0309776 A1 | 11/2013 | Drndic et al. | |
| 2013/0314844 A1 | 11/2013 | Chen et al. | |
| 2014/0030482 A1 | 1/2014 | Miller et al. | |
| 2014/0138314 A1 | 5/2014 | Liu et al. | |
| 2014/0262820 A1 | 9/2014 | Kuan et al. | |
| 2014/0263035 A1 | 9/2014 | Stoltenberg et al. | |
| 2014/0272286 A1 | 9/2014 | Stoltenberg et al. | |
| 2013/0311967 A1 | 10/2014 | Grossman et al. | |
| 2014/0311967 A1 | 10/2014 | Grossman et al. | |
| 2014/0332814 A1 | 11/2014 | Peng et al. | |
| 2015/0010714 A1 | 1/2015 | Appleton et al. | |
| 2015/0044556 A1 | 2/2015 | Wang et al. | |
| 2015/0122727 A1 | 5/2015 | Karnik et al. | |
| 2015/0224451 A1 | 8/2015 | Miyahara et al. | |
| 2015/0231557 A1 | 8/2015 | Miller et al. | |
| 2015/0273401 A1 | 10/2015 | Miller et al. | |
| 2016/0009049 A1 | 1/2016 | Stoltenberg et al. | |
| 2016/0051942 A1 | 2/2016 | Park et al. | |
| 2016/0231307 A1 | 8/2016 | Xie | |
| 2016/0340797 A1 | 11/2016 | Ozyilmaz et al. | |
| 2017/0175258 A1 | 6/2017 | Robinson et al. | |
| 2017/0296972 A1 | 10/2017 | Sinton et al. | |
| 2017/0368508 A1 | 12/2017 | Grossman et al. | |
| 2018/0071684 A1 | 3/2018 | Nair et al. | |
| 2018/0185791 A1 | 7/2018 | Karnik et al. | |
| 2020/0001245 A1 | 1/2020 | Karnik et al. | |

FOREIGN PATENT DOCUMENTS

| | | |
|---|---|---|
| EP | 2511002 A1 | 10/2012 |
| WO | WO 2004/085043 A1 | 10/2004 |
| WO | WO 2010/030382 A1 | 3/2010 |
| WO | WO 2010/043914 A2 | 4/2010 |
| WO | WO 2010/126686 A2 | 11/2010 |

OTHER PUBLICATIONS

Selective Ion Passage through Functionalized Graphene Nanopores, Kyaw Sint, Boyang Wang, and Petr Král, Journal of the American Chemical Society 2008 130 (49), 16448-16449.*
Blankenburg et al. "Porous Graphene as an Atmospheric Nanofilter" small 2010, 6, No. 20, 2266-2271.*
Venkatesan, Bala Murali, et al. "Highly Sensitive, Mechanically Stable Nanopore Sensors for DNA Analysis." Advanced Materials, vol. 21, No. 27, 2009, pp. 2771-2776., doi:10.1002/adma. 200803786. (Year: 2009).*
Merchant, Christopher A., et al. "DNA Translocation through Graphene Nanopores." Nano Letters, vol. 10, No. 8, 2010, pp. 2915-2921., doi:10.1021/nl101046t. (Year: 2010).*
International Search Report and Written Opinion dated Jul. 28, 2014 for PCT/US2014/027309.
International Search Report and Written Opinion for PCT/US2014/063301 dated Mar. 20, 2015.
Apel, Invited Talk: Track etching technique in membrane technology. Radiation Measurements. 2001. 34: 559-66.
Bagri et al. Structural evolution during the reduction of chemically derived graphene oxide. Nat Chem. 2010; 2:581-587.
Bhattacharya. Progress in Polymer Science. 2004; 29:767-814.
Boukai et al. Efficiency enhancement of copper contaminated radial p-n junction solar cells. Chem Phys Lett. 2011; 501:153-158.
Bowden, A perspective on resist materials for fine line lithography. Materials for Microlithography, Advances in Chemistry Series, #266, American Chemical Society, Washington, D.C.. 1984; Chapter 3:39-117.
Chang et al. Densely packed arrays of ultra-high-aspect-ratio silicon nanowires fabricated using block-copolymer lithography and metal-assisted etching. Adv Funct Mater. 2009; 19:2495-2500.
Chowdhury et al. Fullerenic nanostructures in flames. J Mater Res. 1996; 11:341-347.
Cohen-Tanugi et al., Quantifying the potential of ultra-permeable membranes for water desalination. Energy & Environmental Science. 2014; 7:1134-1141.
Deng et al. Progress in Polymer Science. 2009; 34:156-193.
Du et al., Separation of Hydrogen and Nitrogen Gases with Porous Graphene Membrane. J of Physical Chemistry. 2011.115: 23261-6.
Erickson et al. Determination of the local chemical structure of graphene oxide and reduced graphene oxide. Adv Mater. 2010; 22:4467-4472.
Fang et al. Journal of Membrane Science. Mar. 2009; 329:46-55.
Fang et al. Pore size control of ultrathin silicon membranes by rapid thermal carbonization. Nano Lett. 2010; 10:3904-3908.

(56) References Cited

OTHER PUBLICATIONS

Fischbein et al., Electron beam nanosculpting of suspended graphene sheets. Applied Physics Letters. 2008. 93: 113107.
Goel et al. Size analysis of single fullerene molecules by electron microscopy. J Carbon. 2004; 42:1907-1915.
Grantab et al., Anomalous strength characteristics of tilt grain boundaries in graphene. Science. 2010; 330(6006):946-48.
Kemmell et al. Transparent superhydrophobic surfaces by self-assembly of hydrophobic monolayers on nanostructured surfaces. Phys Stat Sol (a). 2006; 203:1453-1458.
Kim et al., Applications of atomic layer deposition to nanofabrication and emerging nanodevices. Thin Solid Films. 2009; 517:2563-2580.
Kim et al., Fabrication and Characterization of Large-Area, Semiconfucting Nanoperforated Graphene Materials. Nano Letters. 2010. 10: 1125-31. DOI: 10.1021/nl9032318.
Kim et al., Selective gas transport through few-layered graphene and graphene oxide membranes. Science. Oct. 4, 2013; 342:91-94.
Lee et al. Measurement of the elastic properties and intrinsic strength of monolayer graphene. Science. 2008; 321(5887):385-88.
Lerf et al. Hydration behavior and dynamics of water molecules in graphite oxide. J Phys Chem Sol. 2006; 67:1106-1110.
Li et al., Ultrathin, molecular-sieving graphene oxide membranes for selective hydrogen separation. Science. Oct. 4, 2013; 342:95-98.
Min et al., Mechanical properties of graphene under shear deformation. Applied Physics Letters. 2011; 98(1).
Mooney et al. Simulation studies for liquid phenol: properties evaluated and tested over a range of temperatures. Chem Phys Lett. 1998; 294:135-142.
Nyyssonen, Optical Linewidth measurement on patterned wafers. SPIE Proceedings, Integrated Circuit Metrology. 1984; 480:65.
O'Hern et al., Selective molecular transport through intrinsic defects in a single layer of CVD graphene. ACS Nano. Nov. 27, 2012;6(11):10130-8.
Pendergast et al., A review of water treatment membrane nanotechnologies. Energy Environ Sci. 2011; 4:1946-1971.
Prabhu et al. SEM-induced shrinking of solid-state nanopores for single molecule detection. Nanotech. 2011; 22:425302-425311.
Schrier, Carbon dioxide separation with a two-dimensional polymer membrane. ACS Appl Mater Interfaces. Jul. 25, 2012;4(7):3745-52.
Singh et al. Journal of Membrane Science. 2008; 311:225-234.
Sint et al., Selective ion passage through functionalized graphene nanopores. J Am Chem Soc. Dec. 10, 2008;130(49):16448-9.
Storm et al. Fabrication of solid-state nanopores with single-nanometre precision. Nat Mater Lett. 2003; 2:537-540.
Suess, Abundances of the elements. Reviews of Modern Physics. 1956; 18:53-74.
Sun et al., Selective ion penetration of graphene oxide membranes. ACS Nano. Jan. 22, 2013;7(1):428-37.
Taffa et al. Pore size and surface charge control in mesoporous $TiO_2$ using post-grafted SAMs. Phys Chem Chem Phys. 2010; 12:1473-1482.
Ulman, Formation and structure of self-assembled monolayers. Chem Rev. 1996; 96:1533-1554.
Van Den Haut et al. Controlling nanopore size, shape and stability. Nanotech. 2010; 21:115304-115309.
Zhu et al. Colloids and Surfaces B: Biointerfaces. 2009; 69:152-155.
Koenig et al., "Selective Molecular Sieving Through Porous Graphene," Nature NanoTechnology, vol. 7, pp. 728-732 (Nov. 2012).
Cohen-Tanugi et al., "Water Desalination Across Nanoporous Graphene," Nano Letters, vol. 12, pp. 3602-3608 (2012).
Lehtinen et al., "Effects of Ion Bombardment on a Two-Dimensional Target: Atomistic Simulations of Graphene Irradiation," Physical Review B, vol. 81, pp. 153401.01-153401.04 (2010).
Jiang al., "Porous Graphene as the Ultimate Membrane for Gas Separation," Nano Letters, vol. 9, No. 12, pp. 4019-4024 (Sep. 23, 2009).
Suk et al., "Water Transport Through Ultrathin Graphene," J. Phys. Chem. Lett., vol. 1, pp. 1590-1594 (Apr. 30, 2010).
Aleman et al., "Transfer-Free Batch Fabrication of Large-Area Suspended Graphene Membranes," ACSNANO, vol. 4, No. 8, pp. 4762-4768 (Jul. 6, 2010).
Russo et al., "Atom-By-Atom Nucleation and Growth of Graphene Nanopores," PNAS, vol. 109, No. 16, pp. 5953-5957 (Apr. 17, 2012).
International Search Report and Written Opinion for PCT/US2013/031963 dated Jun. 11, 2013.
Boutilier et al., Implications of Permeation through Intrinsic Defects in Graphene on the Design of Defect-Tolerant Membranes for Gas Separation. ACS Nano. 2014. 891): 841-9.
Henis et al., Composite hollow fiber membranes for gas separation: the resistance model approach. Journal of Membrane Science. 1981. 8: 233-46.
Allen et al., Honeycomb carbon: a review of graphene. Chem Rev. Jan. 2010;110(1):132-45. doi: 10.1021/cr900070d.
Liu et al., Two-Dimensional-Material Membranes: A New Family of High-Performance Separation Membranes. Angew Chem Int Ed Engl. Oct. 17, 2016;55(43):13384-13397. doi: 10.1002/anie. 201600438. Epub Jul. 1, 2016.
Yoon et al., Graphene-based membranes: status and prospects. Philos Trans A Math Phys Eng Sci. Feb. 13, 2016;374(2060). pii: 20150024. doi: 10.1098/rsta.2015.0024.
Beu et al., Model analysis of the fragmentation of large $H_2O$ and $NH_3$ clusters based on MD simulations. Eur Phys J D. Dec. 2003;27(3):223-9. doi: 10.1140/epjd/e2003-00268-4.
Chu et al., Plugging up leaky graphene. MIT News Office. May 8, 2015. http://news.mit.edu/2015/repair-graphene-leaks-0508. 3 pages.
Joung et al., Determination of alkali and halide monovalent ion parameters for use in explicitly solvated biomolecular simulations. J Phys Chem B, 2008, 112(30), pp. 9020-9041, doi: 10/1021/jp8001614. Epub Jul. 2, 2008.
Kholmanov et al., Improved electrical conductivity of graphene films integrated with metal nanowires. Nano Lett. Nov. 14, 2012;12(11):5679-83. doi: 10.1021/nl302870x.
Muller-Plathe, Local structure and dynamics in solvent-swollen polymers. Macromolecules. 1996;29(13):4782-91.
U.S. Appl. No. 15/634,767, filed Jun. 27, 2017, Grossman et al.
Han et al., Ultrathin graphene nanofiltration membrane for water purification. Advanced Functional Materials. Aug. 7, 2013; 23(29):3693-3700. doi:10.1002/ADFM.201202601.
Boretti et al., Outlook for graphene-based desalination membranes. Clean Water. 2018;1(5):1-11.
Boutilier et al., Molecular Sieving Across Centimeter-Scale Single-Layer Nanoporous Graphene Membranes. ACS Nano. Jun. 27, 2017;11(6):5726-5736. doi:10.1021/acsnano.7b01231.
Oh et al., Design of pressure-driven microfluidic networks using electric circuit analogy. Lab Chip. Feb. 7, 2012;12(3):515-45. doi: 10.1039/c21c20799k. Epub Dec. 16, 2011 Review.
Wang et al., Fundamental transport mechanisms, fabrication and potential applications of nanoporous atomically thin membranes. Nat Nanotechnol. Jun. 6, 2017;12(6):509-522. doi: 10.1038/nnano. 2017.72. Review.
U.S. Appl. No. 16/724,139, filed Dec. 20, 2019, Grossman et al.
U.S. Appl. No. 16/860,054, filed Apr. 27, 2020, Karnik et al.

* cited by examiner

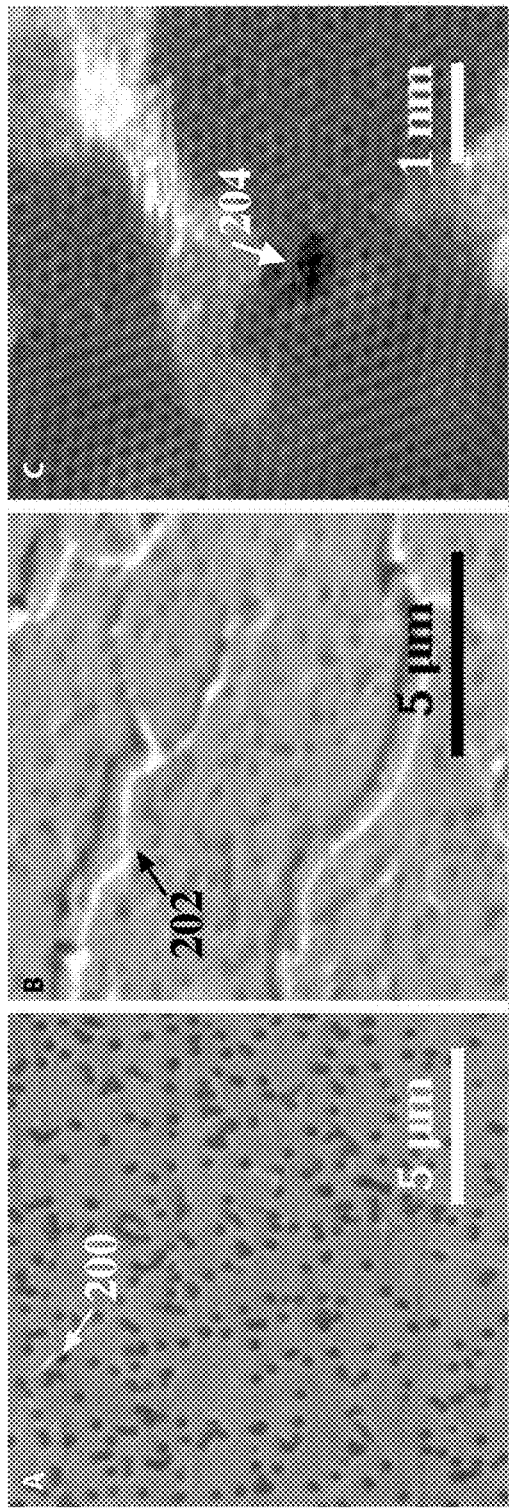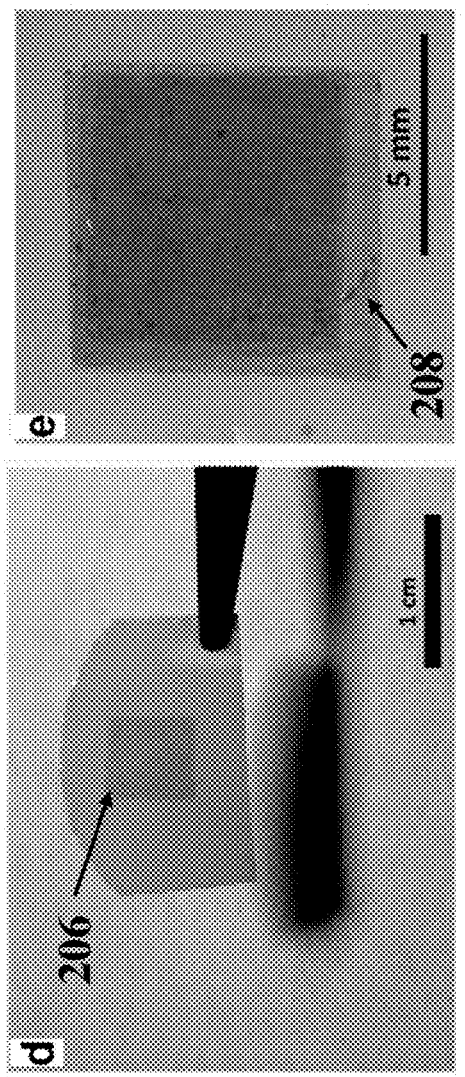
Fig. 3A  Fig. 3B  Fig. 3C  Fig. 3D  Fig. 3E

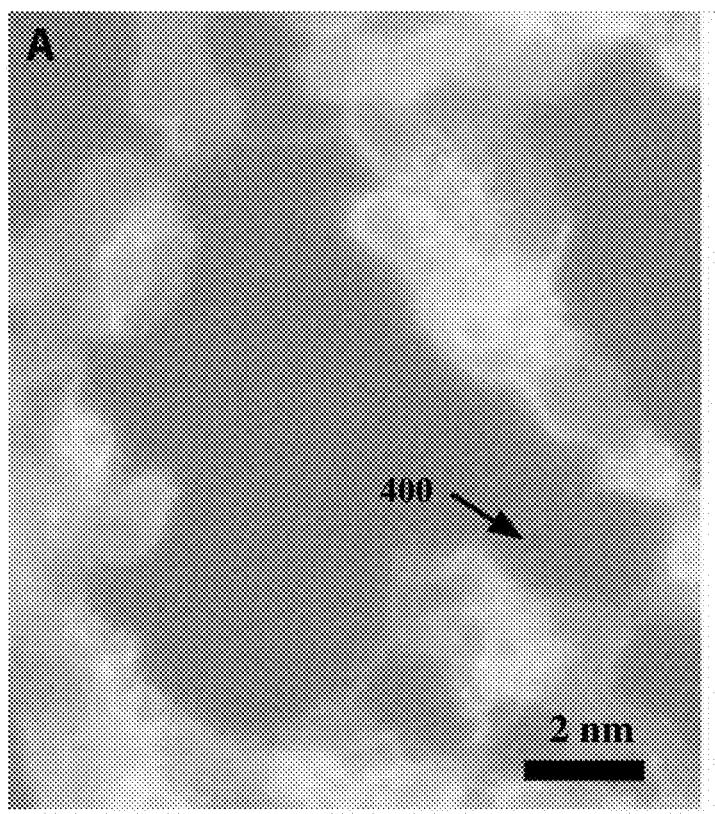
Fig. 5A
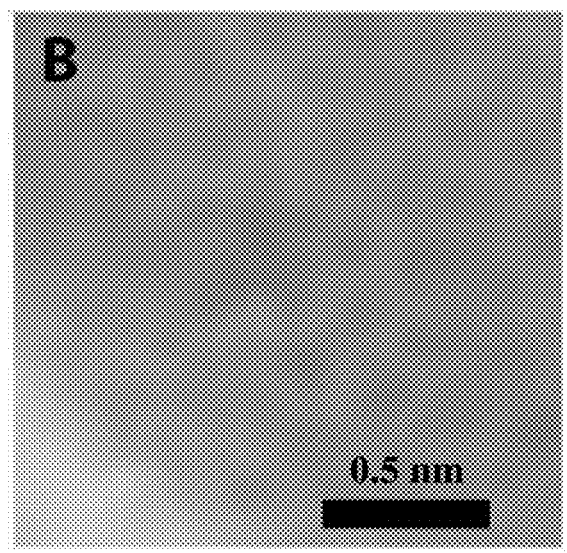 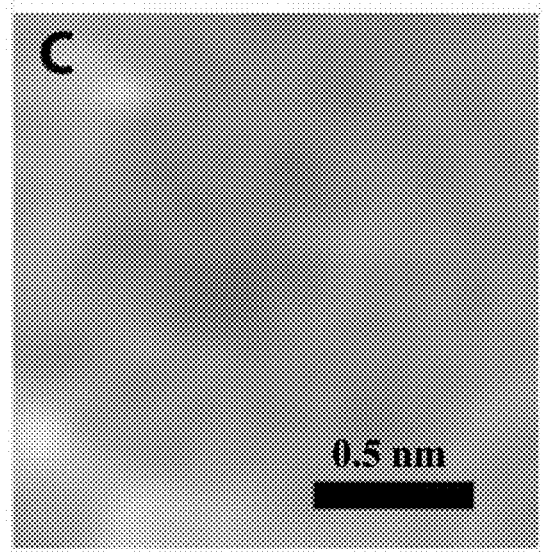
Fig. 5B  Fig. 5C

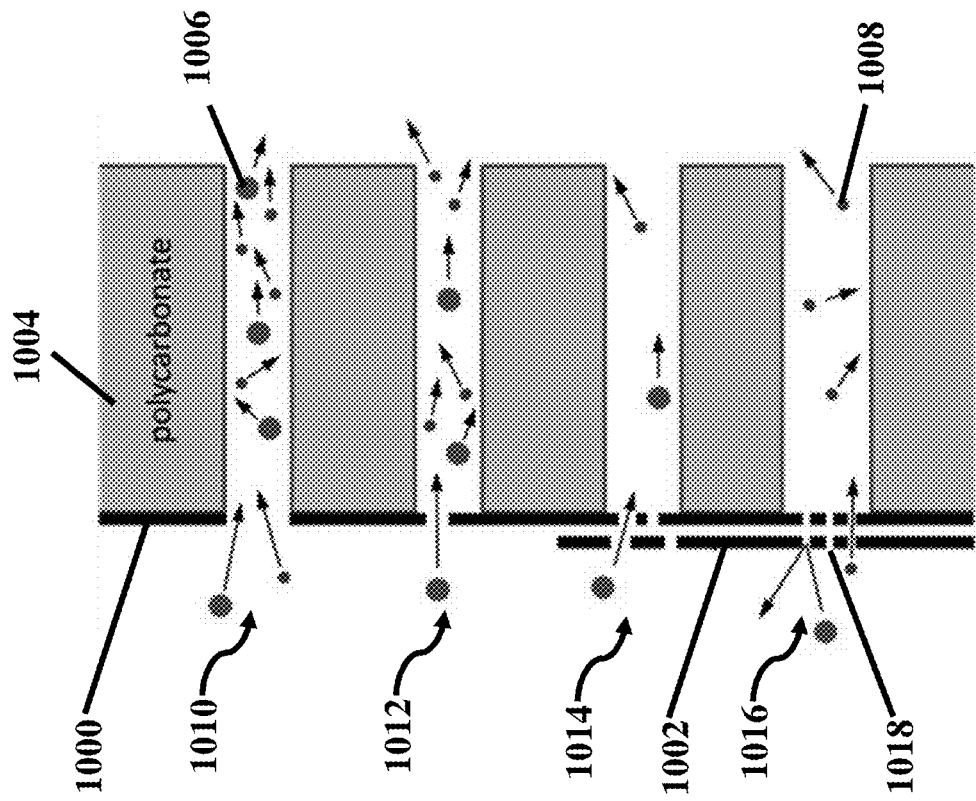
Fig. 11C
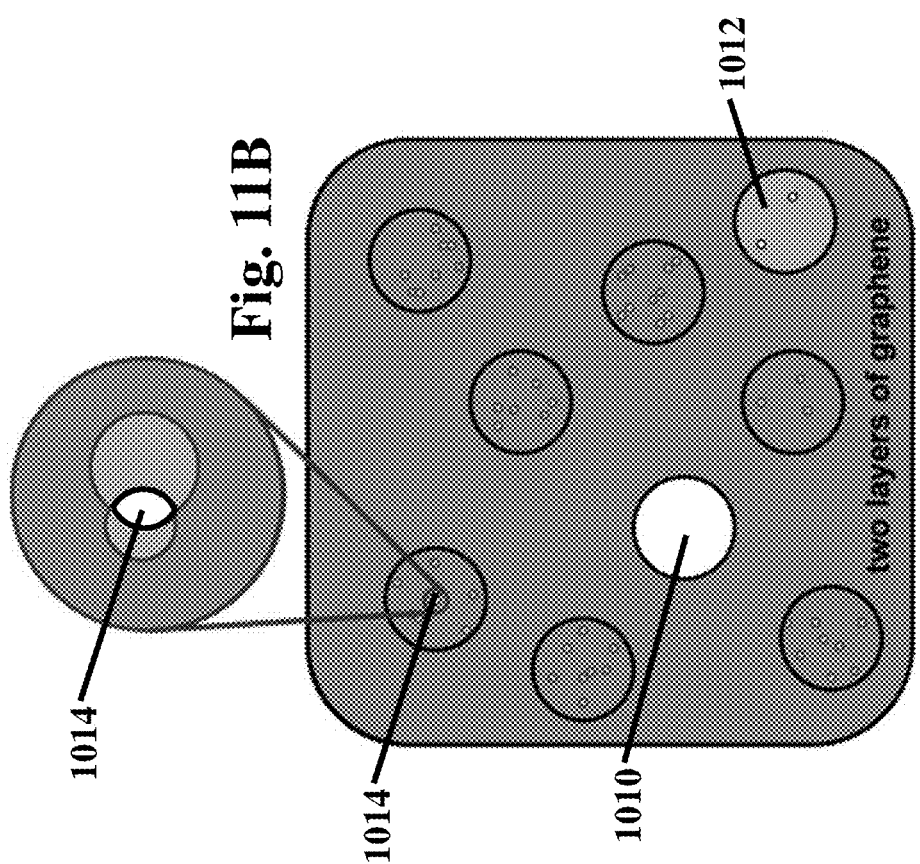
Fig. 11B
Fig. 11A

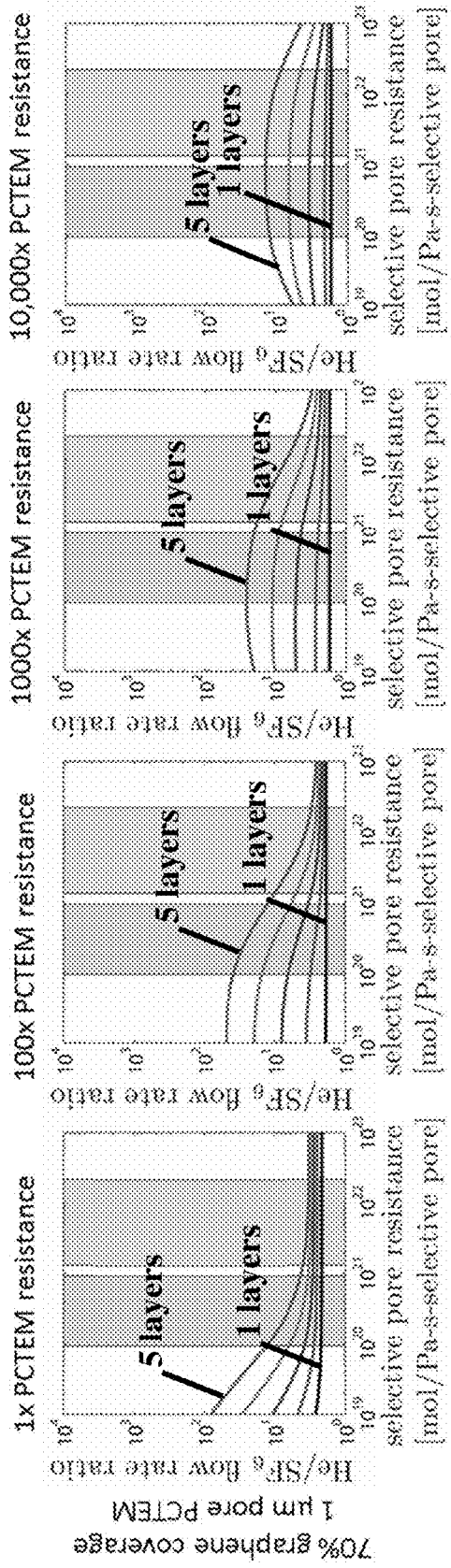
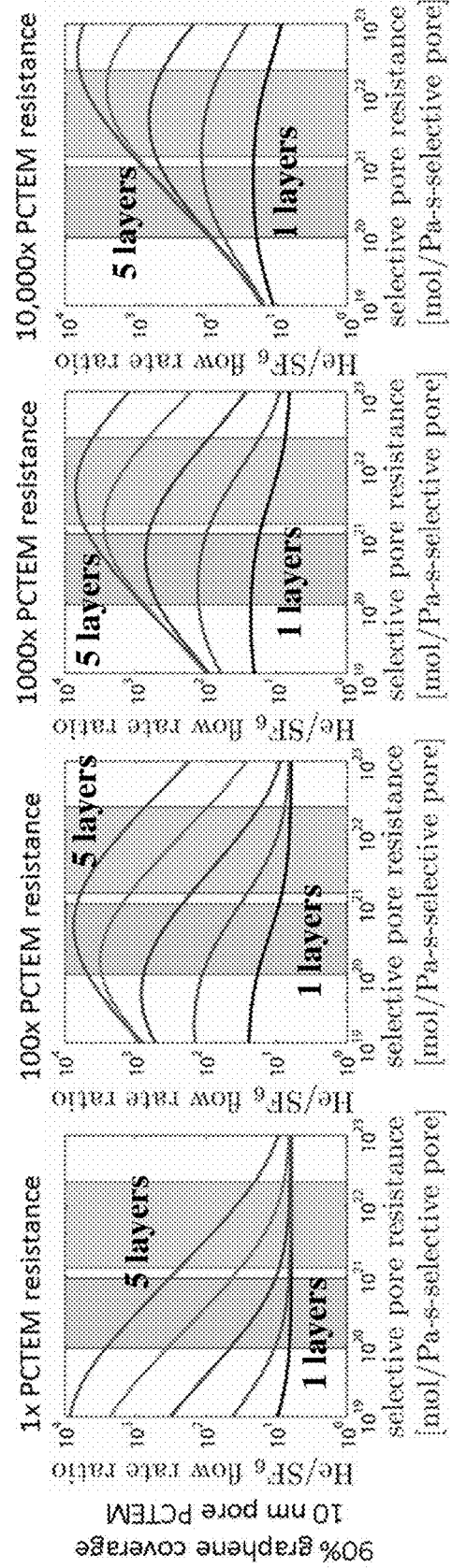
Fig. 14A  Fig. 14B  Fig. 14C  Fig. 14D
Fig. 15A  Fig. 15B  Fig. 15C  Fig. 15D

GRAPHENE BASED FILTER

RELATED APPLICATIONS

This application claims priority to U.S. Provisional Application No. 61/611,067, filed Mar. 15, 2012, entitled GRAPHENE BASED FILTER which is incorporated herein by reference in its entirety.

BACKGROUND

Many industries and applications, such as water purification, chemical synthesis, pharmaceutical purification, refining, natural gas separation, and many other applications rely on energy-intensive membrane separation as a major component of their processes. The need for membranes with high selectivity and flux for both liquid-phase and gas-phase membranes has led to many improvements in ceramic and polymer-based membranes over the past few decades. One of the primary challenges has been maximizing flux while maintaining high selectivity. Typically, increasing flux rate necessitates a decrease in selectivity. While several decades of research has resulted in development of polymeric or ceramic membranes, further advances in membrane technology will likely rely on new membrane materials that provide better transport properties.

SUMMARY

The inventors have recognized that benefit of providing a filtration membrane comprising one or more active layers of graphene or graphene oxide which can be bonded to a porous substrate. The active layers may be disposed on top of each other to minimize the uncovered area of the substrate and may also beneficially mitigate defects present in the other active layers by covering them. The filtration properties may be provided by pores present in the active layers. Furthermore, the flow resistance of the porous substrate may be selected to limit leakage through defects in the graphene layers to a predetermined fraction of the flow through the graphene layers.

In one embodiment, a filtration membrane may include a porous substrate and at least one active layer disposed on the porous substrate. The at least one active layer may include pores. Furthermore, a flow resistance of the porous substrate may be less than approximately ten times a flow resistance of the at least one active layer.

In another embodiment, a filtration membrane may include a porous substrate and at least one active layer disposed on the porous substrate. The at least one active layer may include pores and may comprise at least one of graphene and graphene oxide. Furthermore, a flow resistance of the porous substrate may be less than approximately ten times a flow resistance of the at least one active layer.

In yet another embodiment, a filtration membrane may include a porous substrate and a first active layer disposed on the porous substrate. A second active layer may be disposed on the first active layer. A plurality of pores may be formed in the first and second active layers, and the plurality of pores may pass through both the first active layer and the second active layer.

In another embodiment, a filtration membrane may include a porous substrate and a first active layer disposed on the porous substrate. The first active layer may comprise at least one of graphene and graphene oxide. A second active layer may be disposed on the first active layer and may comprise at least one of graphene and graphene oxide. A plurality of pores may be formed in the first and second active layers, and the plurality of pores may pass through both the first active layer and the second active layer.

In yet another embodiment, a method for producing a filtration membrane may include: providing a first active layer; forming defects in the first active layer; and selectively etching the defects to form pores of a selected size in the first active layer.

In another embodiment, a method for producing a filtration membrane may include: providing a first active layer comprising at least one of graphene and graphene oxide; forming defects in the first active layer; and selectively etching the defects to form pores of a selected size in the first active layer.

In yet another embodiment, a filtration membrane includes an active layer comprising graphene or graphene oxide with a $H_2$ permeability of greater than approximately $10^{-6}$ mol/m2-s-Pa.

In another embodiment, a filtration method may include: providing an active layer; providing a concentration of an occluding molecule; and varying the concentration of the occluding molecule to vary a permeability of the active layer.

It should be appreciated that the foregoing concepts, and additional concepts discussed below, may be arranged in any suitable combination, as the present disclosure is not limited in this respect. Additionally, the foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 3A is an exemplary SEM image of two-layer graphene on a polycarbonate track etched membrane with 0.2 μm pores;

FIG. 3B is an SEM image of two-layer graphene with a crack in the first layer of graphene covered by the second layer;

FIG. 3C is an STEM image of a small intrinsic pore in one layer of graphene covered by another layer of graphene;

FIG. 3D is a photograph of a graphene membrane comprising one layer of chemical vapor deposited graphene positioned on a porous polycarbonate support;

FIG. 3E is a photograph of a graphene membrane comprising three separate layers of chemical vapor deposited graphene stacked independently on a porous polycarbonate support;

FIG. 5A is an STEM image of single-layer graphene with a defect in the lattice;

FIG. 5B is an STEM image of single-layer graphene with a defect in the lattice;

FIG. 5C is an STEM image of single-layer graphene with a defect in the lattice;

FIG. 11A is a schematic representation of a porous substrate with two graphene layers independently stacked thereon;

FIG. 11B is an enlarged view of overlapping pores present in the two graphene layers and the substrate;

FIG. 11C is a schematic representation of different types of flow through the graphene layers and the substrate;

FIGS. 14A-14D present predicted flow rates versus selective pore resistance for 70% graphene coverage of a 1 µm pore polycarbonate track etch membranes with different flow resistances; and FIGS. 15A-15D present predicted flow rates versus selective pore resistance for 90% graphene coverage of a 10 nm pore polycarbonate track etch membranes with different flow resistances.

DETAILED DESCRIPTION

Figure 1:
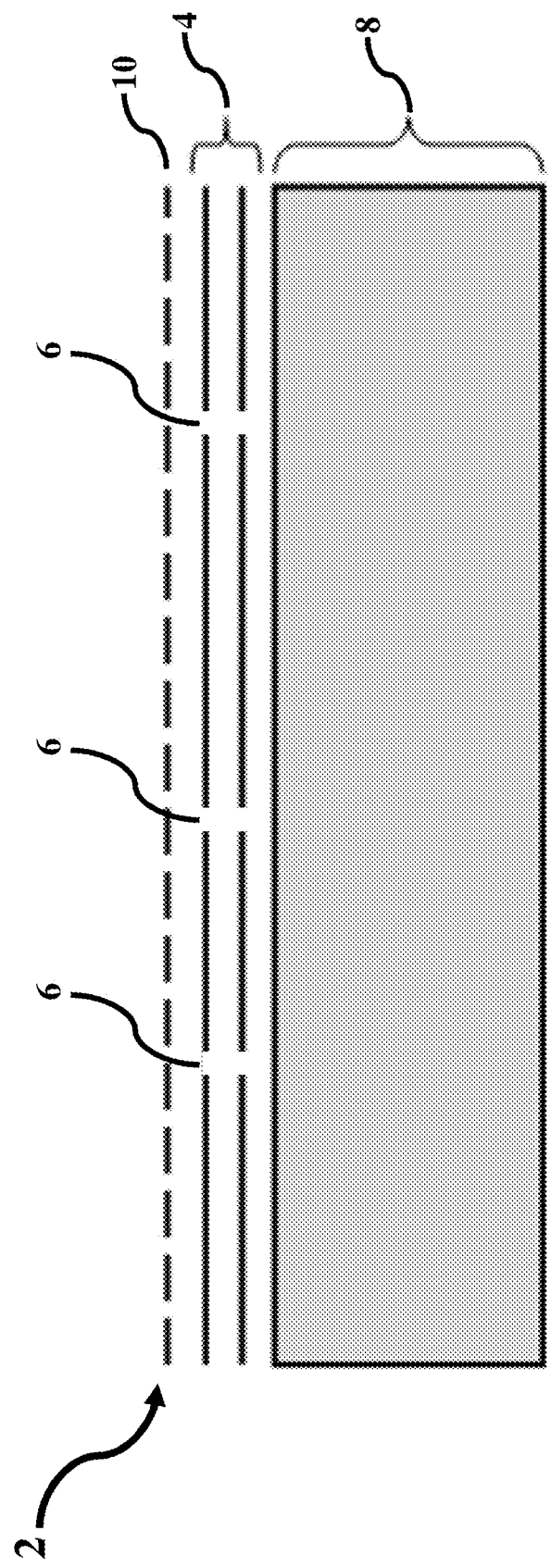
FIG. 1 is a schematic representation of a composite graphene filtration membrane.

The inventors have recognized that graphene, being an impermeable, atomically-thin material, has immense potential as a highly-permeable, highly-selective filtration membrane. Due to the ability to create angstrom and nanometer scale pores in a single sheet of graphene, graphene may have the ability to effectively and efficiently permit selective transport of molecules for filtration. As described in more detail below, angstrom and nanometer-scale pores of controlled size and density can be introduced into the honeycomb lattice of a graphene sheet. These pores in the graphene may function as molecule size-based filters in liquid and gas separation processes. Without wishing to be bound by theory, graphene's ultrathin thickness may permit extremely high permeabilities and corresponding flow rates. Furthermore, the ability to maintain nanometer-scale and sub-nanometer scale pores in graphene's hexagonal lattice may result in transport properties that are more favorable (e.g. better selectivity) as compared to less-organized polymeric membranes. The inventors have also recognized that similar benefits may be obtained through the use of other appropriate two-dimensional materials such as hexagonal boron nitride, molybdenum sulfide, vanadium pentoxide, and others.

In view of the above, the inventors have recognized the benefits of providing at least one active layer on a supporting substrate. The at least one active layer may be graphene or graphene oxide. The filtration properties of the active layer may be governed by pores present in the active layers. These graphene based filtration membranes may be combined with a variety of supporting substrates including, but not limited to, porous ceramics, porous metals, polymer weaves, track-etched membranes, nanofiltration membranes, reverse osmosis membranes, ultrafiltration membranes, brackish water filtration membranes, or any other appropriate substrate. In addition, in some embodiments, the flow properties of both the active layer(s) and the underlying substrate are controlled to provide both high flux and selectivity in addition to being robust (i.e. defect tolerant).

The pores noted above may be formed in any number of ways. For example, intrinsic pores, which in some embodiments may be considered defects, may be created during the formation of the active layers. These intrinsic pores may be naturally present in chemical vapor deposition (CVD) of the active layer, or they may be introduced during the synthesis of the active layer by controlling the substrates on which it is grown. For example, a copper substrate may be patterned with defects, alloyed, or have nanoparticles coated on its surface such that the active layer may not grow in certain regions resulting in pores in the active layer. In certain other embodiments gases such as ammonia or nitrogen may be added during synthesis to create pores, or defects, during the CVD process. In contrast to intrinsic pores, intentionally generated pores may be introduced into the active layers after formation by forming defects in the active layers and selectively etching the defects to a preselected size. For example, in one embodiment, defects are formed in one or more active layers using focused ion beams, plasma (where defects may be induced chemically or through bombardment of the active layers with ions), gas cluster ion-beam bombardment, UV-ozone treatment, doping of the active layer, forming defects in the active layer during synthesis, or any other appropriate techniques. Further, the defects may be formed in a single active layer, or multiple active layers located within a stack of active layers, as the current disclosure is not limited in this fashion. After forming the defects in the one or more active layers, the active layers are exposed to a chemical etchant, or other appropriate etchant. The active layers may correspond to any appropriate two-dimensional materials including graphene, graphene oxide, hexagonal boron nitride, molybdenum sulfide, vanadium pentoxide, and others. In one specific embodiment, examples of chemicals known to etch graphene include, but are not limited to, concentrated nitric acid, mixtures of potassium permanganate and sulfuric acid, hydrogen plasmas, and hydrogen peroxide. As compared to the random distribution and alignment of intrinsic pores, actively created pores may advantageously create pores through, a single active layer, or multiple stacked active layers, in which the pores pass from one side of the active layer(s) to the other. Further, when these pores are created in a stack of active layers, the pores in each active layer may be substantially aligned with one another. However, regardless of how the pores are generated, or whether the pores are present in a single active layer, or in a stack of active layers, the sizes and shapes of the pores may be controlled to create pore sizes appropriate for filtering molecules or particles of a particular size.

While particular types of pores and methods of manufacture have been disclosed above, the current disclosure is not limited to the particular methods disclosed herein. Instead the disclosure should be construed broadly as teaching the use of pores of a desired size in the active layers to provide filtering using either one or a plurality of active layers.

Due to the desired application of filtering various media, it may be desirable to minimize the leakage through the filtration membrane. As described in more detail below, providing a plurality of active layers may advantageously increase the covered area of the substrate and it may also mitigate flow through defects in individual active layers. More specifically, when a plurality of active layers of the same size and shape are placed on a substrate each will be randomly misaligned. However, it is highly improbable that any would be misaligned in exactly the same way. Therefore, some of the area of the substrate left uncovered by one active layer would likely be covered by a subsequently placed active layers. Consequently, the uncovered area of the substrate may be reduced when a plurality of active layers are used. In addition to the above, when a plurality of active layers are used, the majority of defects in any given active layer will likely be covered by undamaged portions of adjacent active layers resulting in reduced flow through defects in the active layers. Therefore, providing a plurality of adjacent active layers may advantageously reduce leakage through the filter by reducing the uncovered area of the substrate and flow through defects formed in any single active layer.

In addition to reducing leakage by providing a plurality of active layers, it may also be advantageous to limit leakage by varying the flow rate of a gas or fluid through the supporting substrate for a given pressure as compared to the active layer(s). More specifically, it may be possible to limit flow through any uncovered portions of the substrate or defects in the active layers by appropriately selecting the flow rate of the bare supporting substrate relative to the flow rate of the active layers under a given pressure. Generally, the higher the flow rate of the bare supporting substrate (e.g. the higher the permeability of the substrate) the higher the leakage. Depending on the permissible amount of leakage the substrate may have a flow rate that is less than approximately 20 times, 10 times, 5 times, or 2 times the flow rate of the active layers.

Without wishing to be bound by theory, certain molecules may occlude the pores in the active layers. When the pores are occluded, the permeability of the filtration membrane may be substantially reduced. Certain large molecules that may occlude the pores include, for example, large organic molecules. It was observed that when the concentration of the occluding molecules was reduced the filtration pores were reopened substantially restoring the permeability of the filtration membrane. Consequently, varying the concentration of the occluding molecules may be used as a reversible method to control the permeability of the filtration membrane.

Turning now to the figures, in one embodiment, the composite membrane 2 may consist of an active separation layer of single or multiple stacked layers of graphene 4, see FIG. 1. However, it should be understood that other appropriate two-dimensional materials such as hexagonal boron nitride, molybdenum sulfide, vanadium pentoxide, and others might be used instead of graphene or graphene oxide. The active separation layer may include angstrom or nanometer-scale pores 6 supported by a porous polymer, ceramic, or other support layer 8. For commercial applications, increasing the durability of the membrane may be desirable, and therefore an optional protective coating 10 may be applied to the graphene to ensure that the membrane will function effectively after repeated handling and/or use. The porous graphene layer may sterically hinder the transport of larger molecules on the upstream side of the membrane while permitting the transport of smaller molecules. Additional mechanisms such as electrostatic and van der Waals interactions may also play a role in selectivity. In addition to the above, the size and density of the pores in the graphene layer can be optimized for the particular application and the sizes of the molecules or particles to be filtered.

Since graphene is atomically thin, the resistance to flow can be much lower than that of other membranes, resulting in a much higher permeability. Further, and as described in more detail below, multiple layers of graphene can be independently formed and stacked one on top of another to cover imperfections in the underlying layers through which large volumes of all species in the mixture could flow. While the multiple layers of graphene, or other appropriate materials, have been depicted as being disposed directly on the adjacent layers, embodiments in which intermediate layers are positioned between the layers of graphene are also possible.

In some embodiments, the pores present in the graphene 4 may be functionalized to enhance the selectivity of the composite membrane. For example, the pores might be functionalized such that they are hydrophobic or hydrophilic depending on the desired application. Specific forms of functionalization may include, but are not limited to, carboxyl groups, hydroxyl groups, amine groups, polymer chains (polyamide, polyethyleneglycol, polyamide, etc), small molecules, chelating agents, macrocycles, and biomolecules (e.g. crown ethers, porphyrins, calixarenes, deferasirox, pentetic acid, deferoxamine, DNA, enzymes, antibodies, etc.). In some embodiments, the above noted functionalizations, as well as other appropriate functionalizations, may be used to modulate transport of a molecule or particle through graphene. For example, and without wishing to be bound by theory: 15-crown-5 preferentially binds sodium ions and may thus regulate its transport, or, it may regulate the transport of other ions or molecules in response to binding of a sodium ion; polyethyleneglycol may preferentially allow transport of only small hydrophilic molecules and ions; and polyamide may allow for the preferential transport of water. In alternative embodiments, only the pores may be selectively functionalized. For example, the pores can have different chemical groups depending on the method of pore creation and treatment due to the pores oftentimes being more reactive than the surface of graphene. These differences can be used to selectively functionalize only the pores. Thus, embodiments in which the surface and/or pores of the graphene are functionalized are possible.

The porous support disposed beneath the graphene may provide structural support to the membrane and may also impede flow through imperfections present in the one or more graphene layers that are not occluded, or otherwise mitigated, by stacking of the multiple layers of graphene. These imperfections include unintentionally created cracks, nanometer scale pores, as well as other types of defects due to the manufacturing or handling of the material that could compromise the selectivity of the membrane. The porous support may provide resistance to flow through areas where large imperfections in the graphene exist, such that flow through the intended pores may still dominate the overall flow through the composite membrane. For example, the porous support may be a polycarbonate track-etched membrane with pore diameters in the range of 5 nm to 10 µm, and pore lengths (i.e. support layer thickness) in the range of 1 µm to 5 mm (FIG. 3). Alternatively, the porous support might be a ceramic support with pores in the size range of 10 nm to 10 µm, and a thickness in the range of 100 µm to 10 mm. Furthermore, the support structure itself may include multiple layers. For example, the polycarbonate layer may rest on a sintered steel porous support. Furthermore, it should be understood that the graphene may be disposed on any other appropriate membrane or substrate. For example, asymmetric polyimide membranes used for reverse osmosis of brackish water or seawater might be used. In such an embodiment, the pore sizes of the membrane may be less than 10 nanometers or less than 1 nanometer.

It may be desirable for the membrane to have a porous support with a resistance to flow approximately matching that of the graphene to limit leakage through defects and uncovered portions of the substrate. Alternatively, the flow resistance of the porous support may be selected to limit leakage through defects and uncovered portions of the substrate to a predetermined faction of the flow through the graphene layers. Thus, appropriately selecting a flow resistance of the supporting substrate may ensure that flow through intentionally created pores is significantly larger than that through imperfections in the membrane. In this context, a flow rate defined by the flow resistance may refer to diffusive transport, convective transport, electrokinetic transport, or any other appropriate transport mechanism. For a dialysis membrane, diffusive transport, and potentially electrokinetic transport, may be of concern. For pressure-driven filtration, convective or Knudsen transport may be of concern.

For illustrative purposes, it may be assumed that the graphene membrane for water filtration allows for a flow rate of X m$^3$/s per meter square, per unit applied pressure. It may also be assumed that the graphene is placed on a support layer that allows for a flow rate of 10,000×, in the same units. If the graphene covers 99% of this support area, then the remaining 1% uncovered area may allow for a flow of 1%×10,000× that is approximately 100 times the flow through graphene. However, if the support allows for flow rate of 2× in the same units, the 1% uncovered area will allow a flow of 1%×2×, or about 2% of the flow through graphene. The latter case significantly diminishes the effect of any uncovered areas of graphene. In some embodiments, it may be desirable to limit the amount of flow through the uncovered area to between approximately 1% to 10% of the flow through the graphene, though smaller percentages are also possible. If the graphene covers approximately 90% of the substrate, the substrate may have approximately 0.1 to 1.0 times the flow rate of the graphene. If the graphene covers approximately 99% of the substrate, the substrate may have approximately 1.0 to 10 times the flow rate of the graphene. If the graphene covers approximately 99.5% of the substrate, the substrate may have approximately 2.0 to 20 times the flow rate of the graphene. Depending on the desired characteristics of the membrane the substrate may have a flow rate less than approximately 20 times, 10 times, 5 times, or 2 times the flow rate of the graphene layers.

Without wishing the bound by theory, the flow resistance of a material is proportional to the inverse of the flow rate through the material. Consequently in view of the above regarding the flow rate of the substrate relative to the one or more graphene layers (including only selective pores), or other appropriate active layer, relations regarding the relative flow resistance of the graphene and the substrate may also be described. For example, in one embodiment, the flow resistance of the substrate may be greater than about 0.0001 times, 0.001 times, 0.01 times, 0.05 times, 0.1 times, 0.2 times, 0.3 times, 0.4 times, 0.5 times, 0.6 times, 0.7 times, 0.8 times, 0.9 times, 1 times, 2 times, 3 times, 4 times, 5 times, 10 times, 100 times, or any other appropriate multiple of the flow resistance of the one or more graphene layers if they had only selective pores, or other appropriate active layers. In addition, the flow resistance of the substrate may be less than about 100 times, 10 times, 5 times, 4 times, 3 times, 2 times, 1 times, 0.9 times, 0.8 times, 0.7 times, 0.6 times, 0.5 times, 0.1 times, 0.01 times, or any other appropriate multiple of the flow resistance of the one or more graphene layers with only selective pores, or other appropriate active layers. Combinations of the above upper and lower ranges may be used (e.g. the substrate might have a flow resistance that is between about 0.05 to 1 times the flow resistance of the corresponding one or more graphene layers or other appropriate active layers; or the substrate might have a flow resistance that is between about 0.0001 to 10 times the flow resistance of the corresponding one or more graphene layers or other appropriate active layers).

Similar calculations may be extended to diffusive transport or other types of transport. Thus, in certain embodiments, the support may ensure that imperfections in the graphene will have negligible influence on the overall selectivity of the membrane. Furthermore, by not using a membrane with significantly higher resistance to flow than that of the graphene, a high permeability of the composite membrane may be maintained. Various porous support materials can provide the support and resistance necessary, including polymer weaves, ceramic supports, track-etched membranes or any other appropriate porous material capable of providing the desired flow resistance and supporting the graphene, or other active layer. In some embodiments, the same function of impeding flow through defects due to providing a desired flow resistance in a structure adjacent to the graphene, or other appropriate active layer, may be achieved by the inclusion of a protective layer exhibiting the desired flow resistance characteristics in addition to protecting the graphene.

Without wishing to be bound by theory, and as described in more detail below, minimizing lateral flow of material within the substrate acting as a support layer (i.e. a flow in a direction that is substantially perpendicular to the flow across the support layer or within the plane of the support layer itself) may help to minimize the leakage flow through defects in the active layers and uncovered portions of the support layer. For example, polycarbonate membranes have somewhat cylindrical pores that can help to isolate defects in the graphene layer. Similarly, an asymmetric support substrate that has a thin, high-resistance layer next to the graphene may also help to minimize lateral flow provided the thickness of this high-resistance layer is small compared to the defect size, or at least smaller than the distance between the defects.

Several options exist for precisely controlling the size of pores created in the graphene lattice. These include, but are not limited to, ion bombardment, chemical etching, gas cluster ion-beam bombardment, pulsed laser deposition, plasma treatment, UV-ozone treatment, and growing graphene on copper with patterned defects. Once the pores are generated, their sizes and shapes can be further refined through chemical etching. Additionally, intrinsic defects or pores in the synthesized graphene can be used for filtration. These pores may occur naturally in chemical vapor deposition (CVD) graphene, or may be introduced during synthesis of graphene by controlling the substrates on which the graphene is grown. For example, the copper substrate for CVD graphene may be patterned, or alloyed, or nanoparticles coated on its surface before growing graphene. Gases such as ammonia or nitrogen may be added during synthesis to create pores during the CVD process. Furthermore, the amorphous regions in graphene may contain a higher number of pores, which can be used for filtration.

Example: Fabrication of a Composite Membrane

Figure 2:
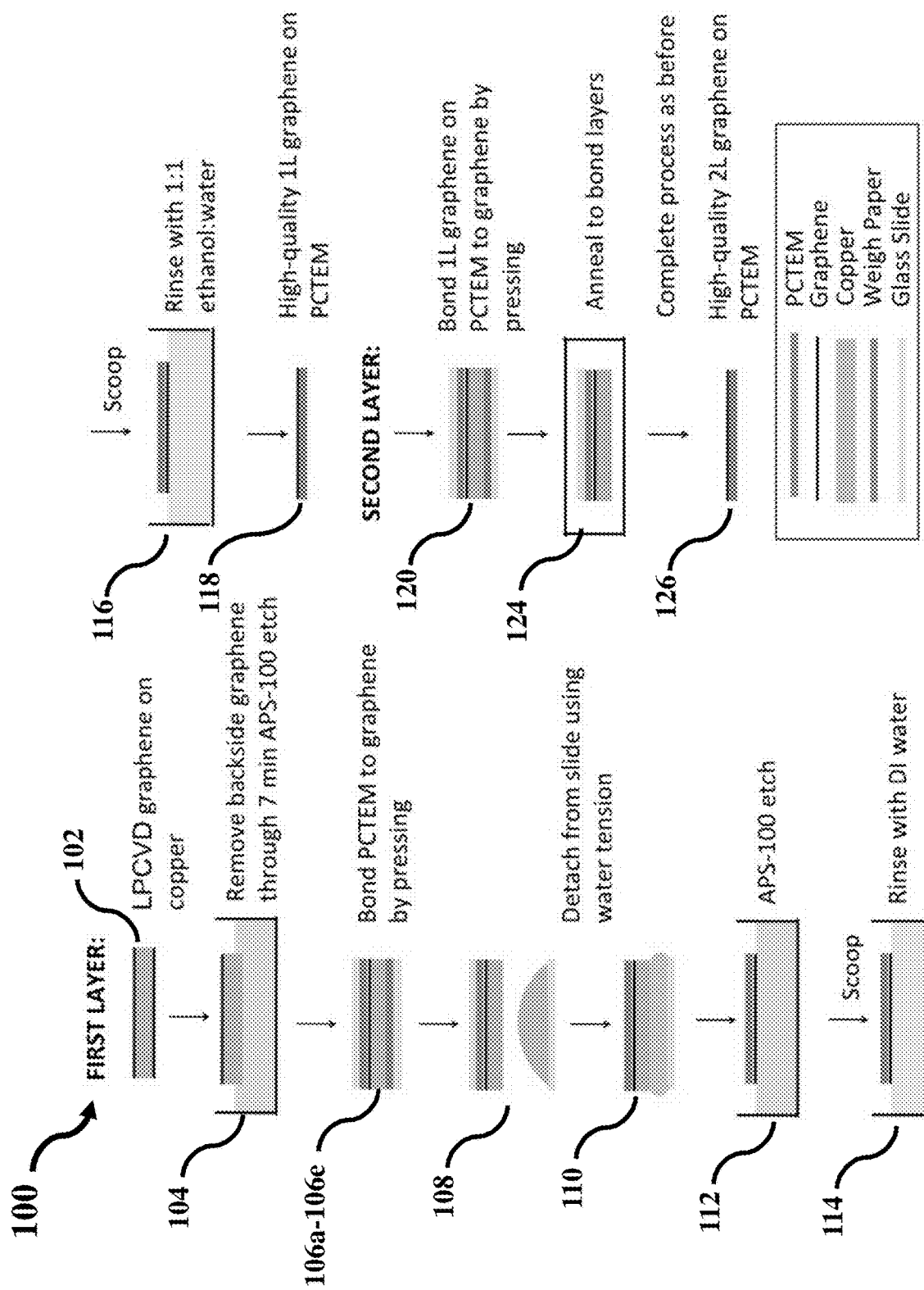
FIG. 2 depicts a representational flow chart of a polycarbonate track etch membrane transfer procedure.

As there are many different possible methods that may be used to place, or form, layered materials on a substrate, the device may be fabricated in many ways. Here, a method 100 is described to transfer large areas of graphene with few pores and tears to a polycarbonate track etched membrane (PCTEM, Sterlitech) with 200 nm pores using a simple pressing procedure, see FIG. 2. PCTEMs are manufactured by etching polycarbonate membranes after irradiation with high-energy particles. PCTEMs typically comprise straight pores that are isolated from neighboring pores. The pores may be cylindrical, but other shapes, such as conical or bullet shapes, are possible. Additionally, while the method is described with regards to a PCTEM, other porous substrates may also be used. The transfer procedure may include all of the subsequently detailed actions, or in some embodiments only a subset of the described actions may be used. In one embodiment, a graphene layer formed using low pressure chemical vapor deposition (LPCVD) on copper foil is provided and cut to size at 102. It should be understood, that other appropriate formation techniques may be used to provide the desired graphene layer. The graphene on the underside of the copper may be partially removed by etching in a copper etchant (ammonium persulfate solution trade name APS-100, from Transene Co.) for 7 min, then rinsing in deionized (DI) water at 104. The freshly-prepared sample may then be placed on a piece of weigh paper, which may in turn sit on a glass slide at 106a. A PCTEM may then be placed smooth-side-down on top of the graphene at 106b. Next, another glass slide may be placed on top of the PCTEM at 106c. To conform the PCTEM to the graphene, a glass pipet tube may be rolled back and forth over the top glass slide under moderate finger pressure at 106d. The pressing may conform the PCTEM to the contours of the graphene, adhering it to the graphene surface. After pressing, the top glass slide may be carefully removed, carrying with it the PCTEM and copper foil with the graphene at 106e. To remove the PCTEM with the graphene from the glass slide, the PCTEM with the graphene may be lightly placed over the top of a thin layer of DI water sitting atop a third glass slide at 108. The surface tension from the DI water may gently pull the PCTEM with the graphene off of the top glass slide and permit it to float on the surface at 110. The PCTEM with the graphene may subsequently be transferred to APS-100 for 5 min past the complete etching of the copper at 112. After etching, the PCTEM-supported graphene may be transferred to two subsequent DI water baths to rinse away residual etchant at 114, rinsed in a 1:1 water:ethanol bath at 116, and air-dried at 118. The final result of the above procedure is high-quality graphene on a porous PCTEM.

By repeating a modified version of the above procedure combined with annealing to bond the graphene layers, multiple layers of graphene can be independently stacked on one another. For example, a graphene layer formed as noted above, may be pressed onto another graphene layer at 120 and then processed similarly to 104-118 to produce a structure 126 with two graphene layers stacked on one another. This may increase the integrity of the membrane as cracks and defects in one layer may be covered by another. The addition of an annealing step 124 after pressing the two graphene layers into contact may encourage interlayer pi-bonding to occur, which may enhance the quality of the second layer coverage.

Other methods could be used to transfer graphene to the porous supports. These methods may include, but are not limited to: utilizing a sacrificial polymer layer as a temporary support while etching away the copper; directly transferring to a porous support using the evaporation of a solvent as a bonding agent; and etching away pores in the copper, effectively making the copper the porous support. Additionally, other sources of graphene could be used as an active layer, including graphene oxide, reduced graphene oxide, and epitaxial graphene. Further, if carefully controlled, spinning or vacuum filtration could be used to deposit one or more layers of a material on a porous support substrate to form the one or more graphene layers, or other appropriate active layers.

Example: Characterization of Graphene on PCTEM

The quality of single and multiple layers of graphene on porous polycarbonate supports were assessed using scanning electron microscope (SEM) and scanning transmission electron microscope (STEM) images as well as gas transport and pressure-driven water transport measurements. SEM images of graphene on PCTEMs were acquired in a Helios Nanolab Dualbeam 600. An example of an SEM image of double-layer graphene on a PCTEM is presented in FIG. 3A. In this image, the 0.2 μm pores in the polycarbonate beneath the graphene are visible. The darker pore 200 is not covered by graphene. By using images from several sample locations, and counting the number of pores with more than 20% of their area not covered in graphene, the percentage of pores over which graphene is suspended can be determined. Based on fifteen images totaling 17257 μm2 area of single-layer graphene on a PCTEM, the ratio of covered pores to open pores was estimated to be 98.3%. Similarly, based on ten images totaling 11464 μm2 area of double-layer graphene on a PCTEM, the ratio of covered pores to open pores was estimated to be 99.6%.

To provide a graphene membrane with sub-nanometer size pores to effectively separate molecules and allow control over the molecule sizes permitted to pass through the membrane, the flow of molecules through intrinsic defects in the graphene and through uncovered pores in the support may be significantly smaller than that through the manufactured pores. To produce membranes with a sufficiently small area of intrinsic defects, multiple layers of graphene were stacked until the flow rate through the membrane without intentionally created pores was sufficiently low. The ability of stacked layers to cover imperfections in other layers is shown in FIGS. 3B and 3C. FIG. 3B presents an SEM image of a relatively large crack 202 in the first layer of graphene being covered by the second layer. FIG. 3C shows an STEM image obtained using a Nion UltraSTEM 200 aberration corrected STEM. It shows a small pore 204 in one layer of graphene, with a size of several carbon rings, covered by the second layer of graphene. These images demonstrate that providing multiple layers of graphene in a stack can reduce both the number of uncovered intrinsic cracks and pores in the graphene membrane. FIG. 3D is a photograph of a graphene membrane comprising one layer of chemical vapor deposited graphene positioned on a porous polycarbonate support with 200 nm pores. FIG. 3E is a photograph of a graphene membrane comprising three separate layers of chemical vapor deposited graphene stacked independently on a porous polycarbonate support with 1 μm pores.

Figure 4A:
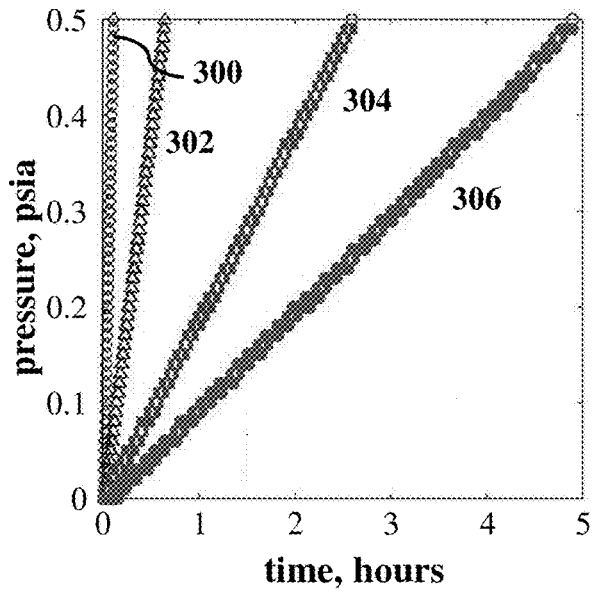
FIG. 4A is a graph of the measured pressure rise of nitrogen gas in a downstream reservoir for flow through various numbers of graphene layers on a polycarbonate track etch membrane with 1.0 μm pores.
Figure 4B:
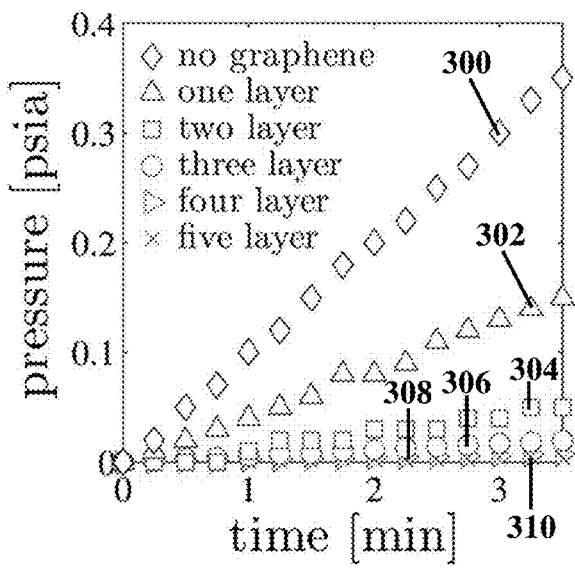
FIG. 4B is a graph of the measured pressure rise of nitrogen gas in a downstream reservoir for flow through various numbers of graphene layers on a polycarbonate track etch membrane with 1.0 μm pores.
Figure 4C:
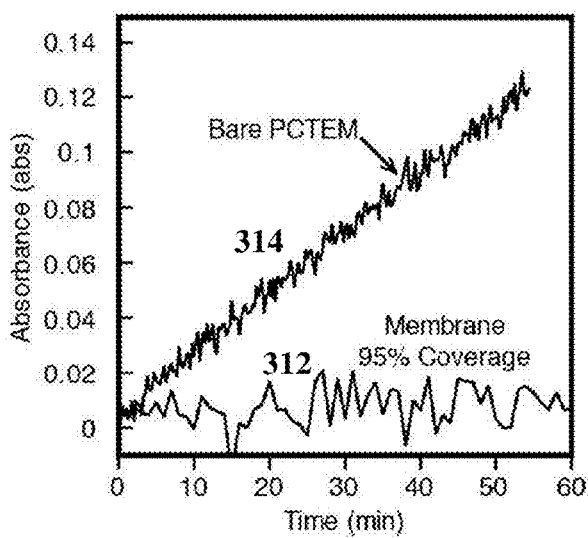
FIG. 4C is a graph of the increase in absorbance with time in a downstream chamber of a flow cell for pressure driven convection of Allura Red AC through a single layer of graphene on a polycarbonate track etch membrane as compared to a bare polycarbonate track etch membrane with 0.2 µm pores.

To quantify the improvement in graphene coverage by stacking multiple layers of graphene, flow rates of gases through PCTEM 300 was compared to flow rates of gases through membranes with one layer 302, two layers 304, three layers 306, four layers 308, and five layers 310 of graphene on PCTEM with 1 μm pores before intentionally creating sub-nanometer size pores in the layers. Gas flow rates were measured by placing the different membranes between an upstream chamber, which was maintained at an approximate pressure of 15 psi using a compressed gas cylinder, and a downstream reservoir, initially at an approximate pressure of 0 psi. The change in pressure with time in the downstream reservoir was measured and used to determine the molar flow rate through the membrane. In separate experiments, nitrogen and helium were used as the supplied gas. Examples of measurements obtained by this procedure are presented in FIGS. 4A and 4B which present measurements taken over time frames of several hours and several minutes respectively. A similar measurement of pressure-driven convection of Allura Red AC through single layer graphene on 0.2 μm pore PCTEM 312 is shown in FIG. 4C where a 95% reduction in the flow rate of this large molecule as compared to flow through bare PCTEM 314 is observed.

Figure 4D:
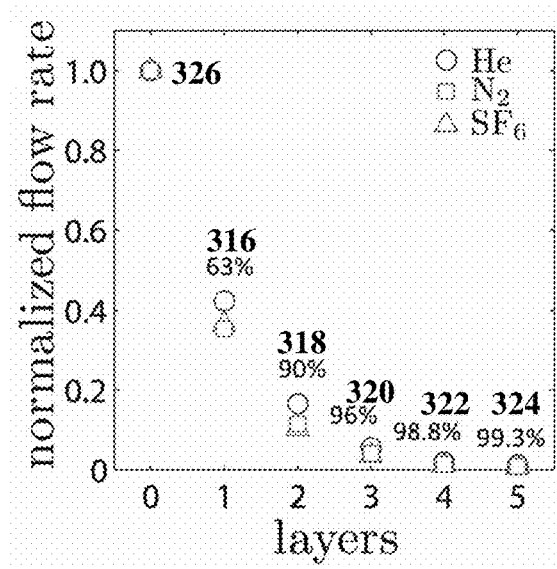
FIG. 4D is a graph of the normalized flow rates of helium, nitrogen, and sulfur hexafluoride through a bare polycarbonate track etch membrane and bare polycarbonate track etch membranes with various numbers of graphene layers.

Flow rates of nitrogen, helium, and sulfur hexafluoride ($SF_6$) through composite membranes comprising one layer 316, two layers 318, and three layers 320, four layers 322, and five layers 324 of graphene were compared to their flow rates through PCTEMs without graphene 326. The results are plotted in FIG. 4D. The data shows that with single-layer graphene, flow through uncovered pores and intrinsic pores is significant, exhibiting about a 63% reduction of the flow rate as compared to bare PCTEM for these gas molecules. However, with three layers of graphene, the flow rate is reduced by approximately 96% as compared to bare PCTEM. In addition, when five layers of graphene are used, the flow rate is reduced by about 99.3% as compared to bare PCTEM for these gas molecules. This demonstrates that, by independently stacking graphene layers, it is possible to create membranes with areas on the order of 1 $cm^2$ that significantly impede the flow of gases (and presumably other molecules as well). Furthermore, with this percentage flow rate reduction, it is expected that the flow through these intrinsic defects will be sufficiently small as compared to the flow through intentionally created pores which may allow these membranes to provide higher selectivity than is possible with current membrane separation technology.

Example: Transport Through Intrinsic Pores in Graphene

As a proof of concept of graphene membrane selectivity, the transport of salt and organic dye molecules through intrinsic defects in single-layer graphene on a PCTEM was measured. Even without intentionally generating pores, single-layer LPCVD graphene (obtained from ACS Materials), which contains intrinsic defects 400 that are about 1 nm in size, can be exploited as an effective nanofiltration membrane for low molecular weight organic molecules, see FIGS. 5A-C.

Figure 5D:
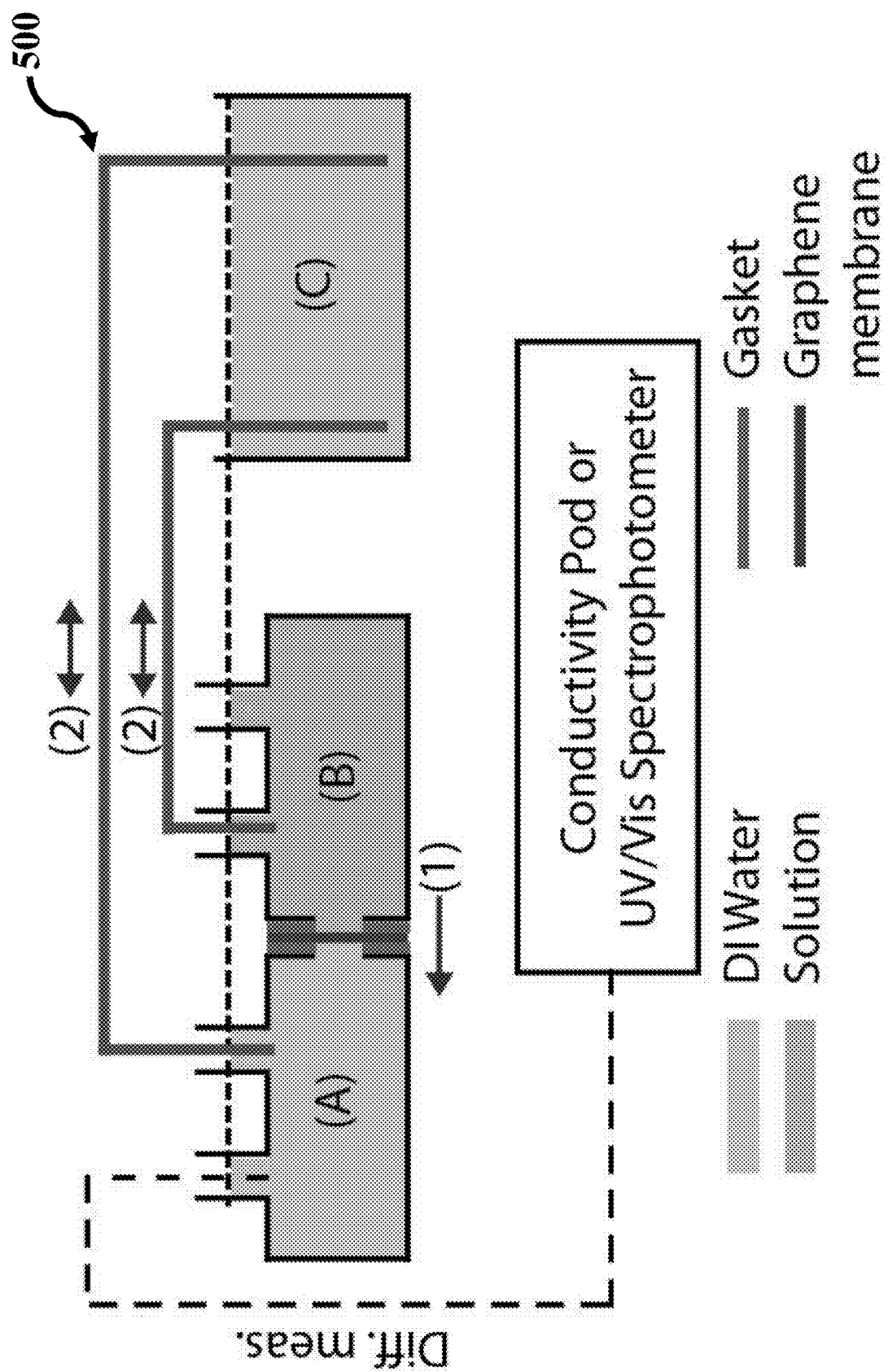
FIG. 5D is a schematic representation of an experimental setup for testing the performance of a membrane.

To elucidate the selectivity of the pores, the diffusion of potassium chloride (MW of 74.55 g/mol), tetramethylammonium chloride (TMAC, MW of 102 g/mol), Allura Red AC (MW of 496 g/mol), and Brilliant Blue R (BBR, MW of 825 g/mol) were measured using a Permegear Side-bi-side diffusion cell 500 coupled to a large external bath, see FIG. 5D. The external bath ensured negligible convective transport through the membrane as any height difference between the two diffusion cell chambers would equalize to the height of the external bath. For the KCl and TMAC measurements, one side of the cell contained the salt solution and the other DI water. To calculate the diffusion rate, the rate of conductivity change in the DI water bath was measured using an eDAQ IsoPod Conductivity probe. For the dye experiments, one side of the cell contained 0.5 M KCl and the other the dye dissolved in 0.5 M KCl. The addition of the KCl eliminated electroosmotic flow due to the highly-mobile counter ions present in the pure dye solution. The diffusion rate of the dye was measured by probing the 0.5 M KCl side of the membrane with a Cary 60 UV-Vis Spectrophotometer and collecting the absorption change as a function of time.

Figure 5E:
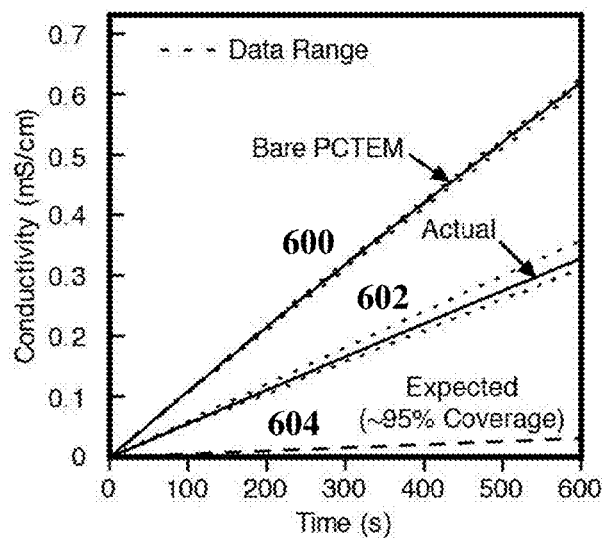
FIG. 5E is a graph comparing the diffusive transport of KCl across a bare polycarbonate track etch membrane and a polycarbonate track etch membrane with a single low pressure chemical vapor deposition graphene layer, and the expected value for a nonporous graphene layer that covers 95% of the polycarbonate pores.

FIG. 5E presents the change in conductivity versus time for a bare PCTEM 600 and a graphene covered PCTEM 602 tested using the method described above. The experimental results are compared to the expected change in conductivity versus time for a coverage area of approximately 95% 604.

Figure 5F:
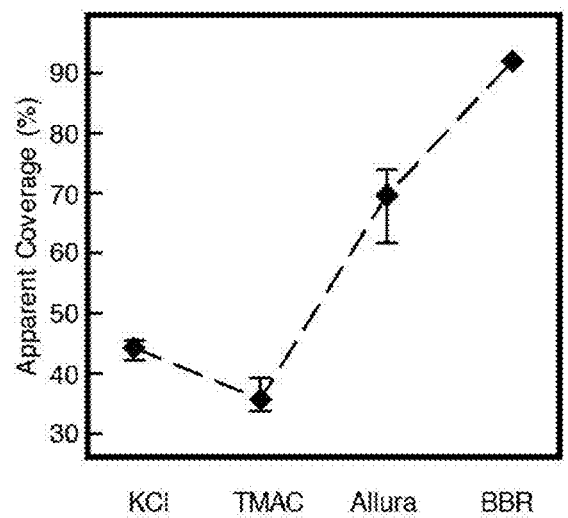
FIG. 5F is a graph depicting the apparent graphene coverage area for various molecules.
Figure 5G:
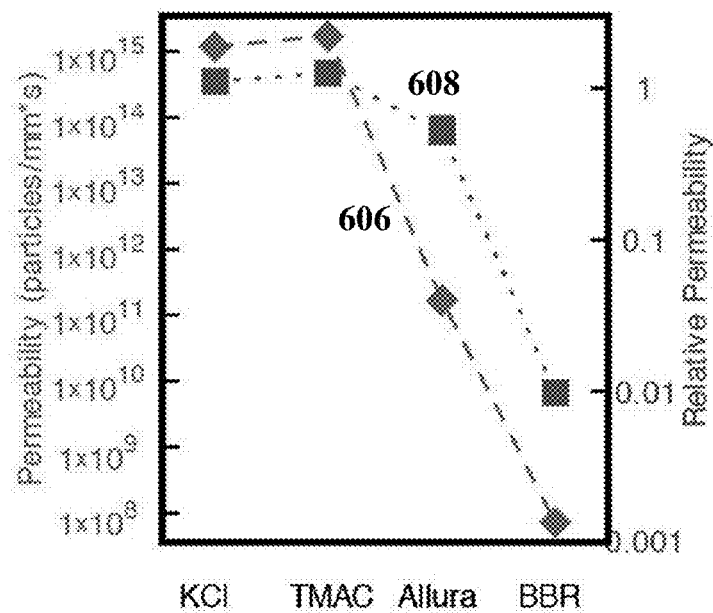
FIG. 5G is a graph of permeability and normalized permeability of the membrane for various molecules.

As illustrated in the graph, the change in conductivity versus time for the graphene covered PCTEM lies between the bare PCTEM and expected value. In contrast to previous findings that pristine graphene is impermeable, appreciable transport of KCl through the LPCVD graphene was observed. In addition to the above, the apparent coverage of the membrane increases as the size of the particle transporting through the membrane increase, with BBR showing an apparent coverage of 93%, see FIG. 5F. Additionally, the permeability of the membrane was calculated and it was found that the salt particles diffuse readily through the membrane whereas the organic dye diffuses orders of magnitude slower. To isolate the effect of the particle size, the measured permeability of the graphene 606 was normalized 608 to the permeability of the PCTEM and it was found that the organic dye was rejected more readily, see FIG. 6G. Without wishing to be bound by theory, these results suggest that LPCVD graphene without modification can be used as a nanofiltration membrane with a molecular cutoff weight between ~450-800 Da.

Example: Characterization of Manufactured Graphene

Figure 6A:
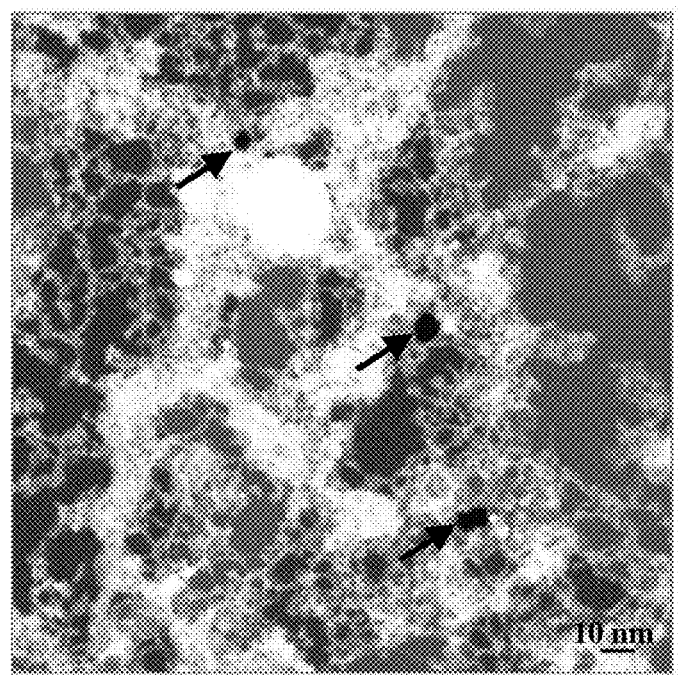
FIG. 6A is an STEM image of defects within a graphene sheet.
Figure 6B:
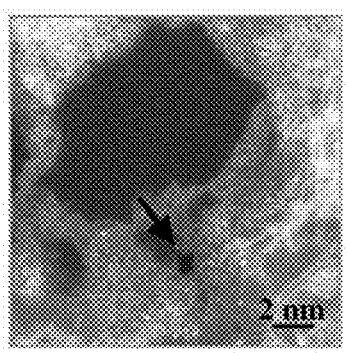
FIG. 6B is an STEM image of defects within a graphene sheet.
Figure 6D:
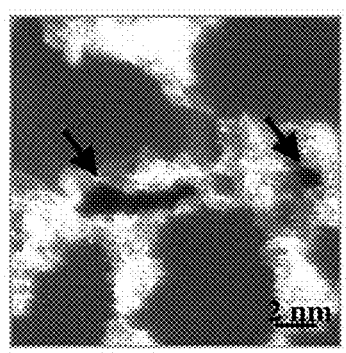
FIG. 6D is an STEM image of defects within a graphene sheet.
Figure 6F:
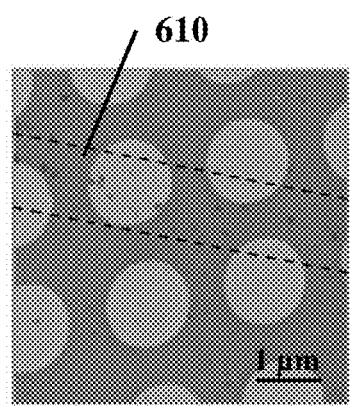
FIG. 6F is an SEM image of defects within a graphene sheet.
Figure 6C:
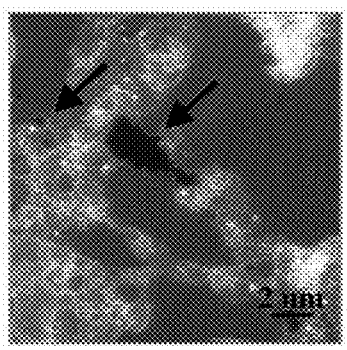
FIG. 6C is an STEM image of defects within a graphene sheet.
Figure 6E:
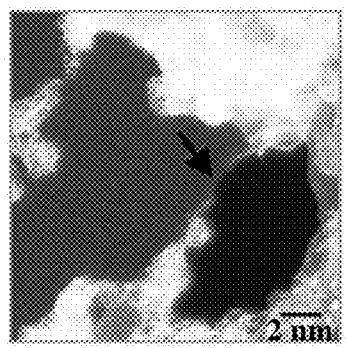
FIG. 6E is an STEM image of defects within a graphene sheet.
Figure 6G:
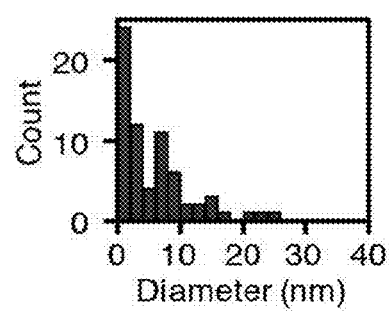
FIG. 6G presents the size distribution of measured defects within the graphene sheet.
Figure 7A:
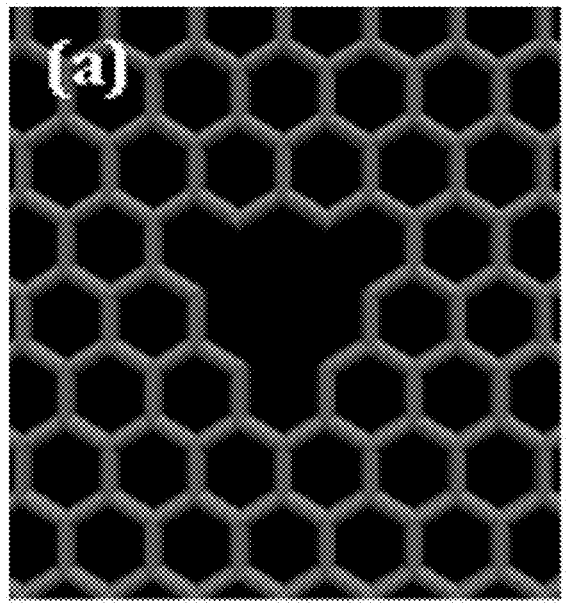
FIG. 7A is a schematic representation of a graphene pore with an area of 6 units used in a molecular dynamics simulation.
Figure 7B:
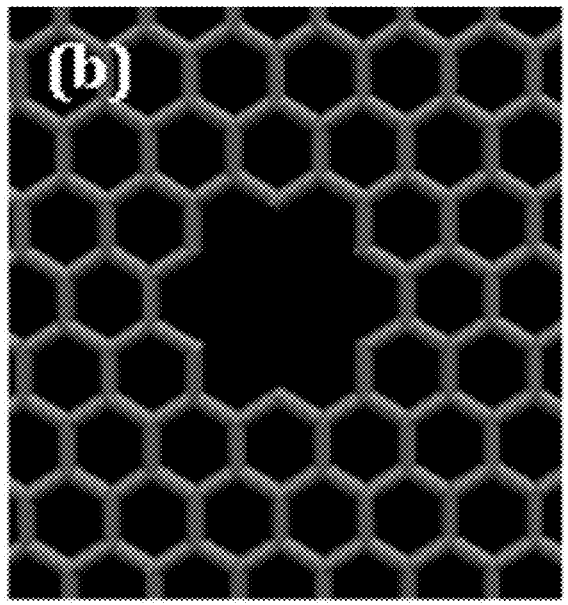
FIG. 7B is a schematic representation of a graphene pore with an area of 7 units used in a molecular dynamics simulation.
Figure 7C:
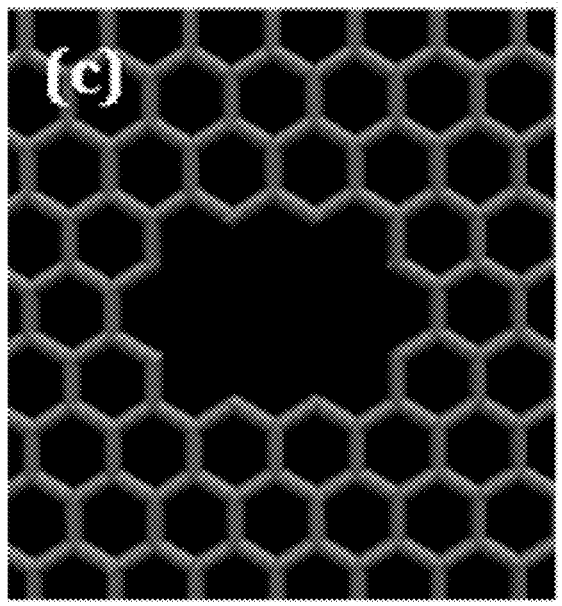
FIG. 7C is a schematic representation of a graphene pore with an area of 10 units used in a molecular dynamics simulation.
Figure 7D:
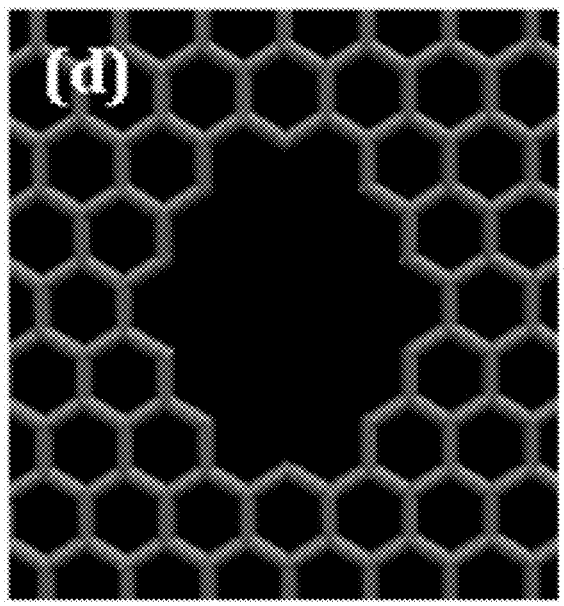
FIG. 7D is a schematic representation of a graphene pore with an area of 14 units used in a molecular dynamics simulation.

The inventors have recognized that intrinsic defects within a graphene sheet are typically not well-controlled by many manufacturers. To determine typical size distributions of defects present within commercially available graphene, a detailed characterization of the pores in a graphene sample was performed using aberration-corrected STEM. Nanometer-scale pores were identified in the graphene sample, see arrows in FIGS. 6A-6E highlighting representative images of pores varying in size from 1 nm to 15 nm in diameter. FIG. 6F shows an image of a sample including a higher concentration of pores within a region 610 between the dashed lines in the figure. As indicated by the size distribution of the identified pores presented in FIG. 6G, approximately 83% of the pores within the graphene lattice are less than approximately 10 nm in diameter. In other graphene samples shown in FIG. 5, the pores were about 1 nm in size. Measurements of transport through the characterized membranes showed size-selective transport that was consistent with the observed pore-size distribution noted above.

Example: Modeling Pore Sizes for Various Applications

The selective separation of one molecular species from another may be highly dependent on pore size in nanoporous graphene. Hence, selection of pore sizes may provide high selectivity through molecular size exclusion. Molecular dynamics simulations can be used to determine the optimal pore geometry for a particular filtration application. To demonstrate this procedure, a parametric study of methane ($CH_4$) and hydrogen ($H_2$) fluxes pores of different sizes was conducted, which has relevance to natural gas processing. However, a similar analysis can be applied to any specific separation system to determine the optimal pore geometry used in the membrane design.

A graphene sheet with pores of selected sizes separating a mixture of $CH_4$ and $H_2$, each at partial pressures of 1 atm, from an evacuated volume was simulated. A large number of molecular trajectories were calculated over the duration of the simulation to obtain estimates of transport rates through the nanoporous graphene membranes. The average flux through the graphene membrane for each species was estimated by dividing the total number of molecule crossings of each species by the duration of the simulation.

Simulations were performed on single-layer graphene membranes with four different pore sizes in order to investigate the dependence of membrane permeability on pore size. A schematic representation of the pores, with a respective area of 6, 7, 10 and 14 hexagonal lattice units is presented in FIGS. 7A-D. The corresponding molecular flux through the graphene membrane is plotted against pore size in FIG. 8 for $H_2$ 700 and $CH_4$ 702.

Figure 8:
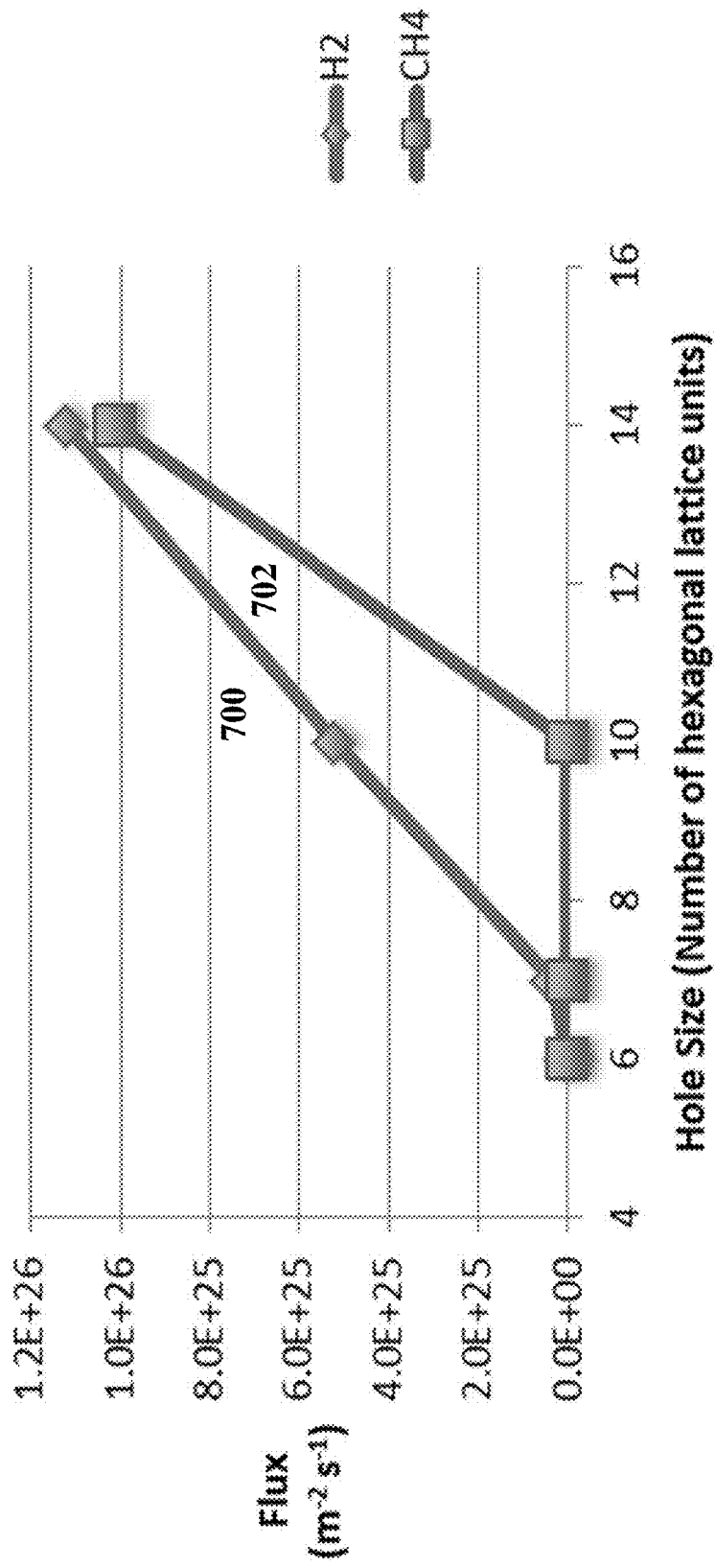
FIG. 8 is a graph of molecular flux versus pore size as determined from molecular dynamics simulation.

The simulations demonstrate that permeance is enhanced for both species in membranes with larger pores. As the pore size is reduced, a greater decrease in permeance to methane is observed, as compared to hydrogen. The differential transport rates of both species demonstrate the presence of a molecular size exclusion effect for a range of pore sizes. In addition, as shown in FIG. 8, a pore size of 6 units and less is impermeable to $H_2$, whereas a pore size of 10 units and less is impermeable to $CH_4$. These results suggest that a pore size of 10 units is optimal: a high permeance of the desired species can be achieved with excellent selectivity, as the pore is large enough to let $H_2$ pass with sufficiently large flux and small enough to be impermeable to $CH_4$. The estimated flux of $H_2$ through a graphene sheet with 2.5% pore coverage (corresponding to a pore of size 10 units per 3 nm×3 nm area) is about $5 \times 10^{25}$ $m^{-2}s^{-1}$. This translates into a flow rate of about 0.85 mol/s for a 10 cm×10 cm sheet, which is a sufficiently high to be commercially viable. This permeability rate is compared to other types of membrane materials in Table 1 below. As noted in the table, the estimated $H_2$ permeability of the graphene membrane from molecular dynamic estimates is approximately $8.5 \times 10^{-4}$ mol/$m^2$-s-Pa. Even when a 1μ, thick membrane is assumed a 23.8 Barrer polystyrene membrane only has a flow rate of $7.3 \times 10^{-9}$ mol/$m^2$-s-Pa. Furthermore, the highest permeability rate among the listed conventional materials is $50 \times 10^{-8}$ mol/$m^2$-s-Pa for alumina prepared by a sol-gel procedure when at 473 K. Therefore, the graphene membrane may offer $H_2$ permeabilities several orders of magnitude greater than those offered by other conventional materials. In some embodiments the composite graphene membrane may provide $H_2$ permeability greater than approximately $10^{-6}$ mol/$m^2$-s-Pa, $10^{-5}$ mol/$m^2$-s-Pa, or $10^{-4}$ mol/$m^2$-s-Pa.

| Membrane Type | $H_2$ Permeability/Permeance | Selectivity $H_2/CH_4$ |
| --- | --- | --- |
| polysulfone | 12.1 Barrer | 30.3 |
| Polystyrene | 23.8 Barrer | 29.8 |
| Polymethyl methacrylate | 2.4 Barrer | 4.0 |
| Polyvinylidene fluoride | 2.4 Barrer | 1.8 |
| modified Vycor prepared by High-temperature atmospheric CVD at 873 K | $1.8 * 10^{-8}$ mol/$m^2$-s-Pa | 23000-27000 |
| alumina prepared by sol-gel procedure at 473 K | $50 * 10^{-8}$ mol/$m^2$-s-Pa | 5000 |
| MD estimates for graphene membrane | $8.5 * 10^{-4}$ mol/$m^2$-s-Pa | — |

Examples: Methods to Generate Pores

In one embodiment, a method to generate pores of controlled size and density may include ion bombardment followed by chemical etching. Without wishing to be bound by theory, it is hypothesized that ion bombardment can create single, double, and complex vacancies in the graphene lattice, depending on the angle at which the graphene is bombarded, the energy of bombardment, and the size of the incident ions. However, these defects may not result in permeable pores. To further control the generation of pores from the defects, the graphene was etched using a chemical oxidant. Results are presented for etches performed with ammonium persulfate as well as a mixture of sulfuric acid and potassium permanganate. While specific etchants are used, other acid-based etchants and oxidizers could be used for the same function including, for example, hydrogen peroxide or any other chemical that etches graphene preferentially at defects or edges. Without wishing to be bound by theory, it is believed that the etchant attacks the graphene at the highly reactive disordered regions of the lattice, including the grain boundaries and the defect sites caused by the bombardment, at a much faster rate than at the pristine lattice. This may result in many lattice pores spread evenly across the graphene layer. Furthermore, the size of the pores may be controlled by the type of etchant used and the length of time the etchant is applied. The resulting pores produced using this method can then be used to transport molecules across the membrane.

Figure 9A:
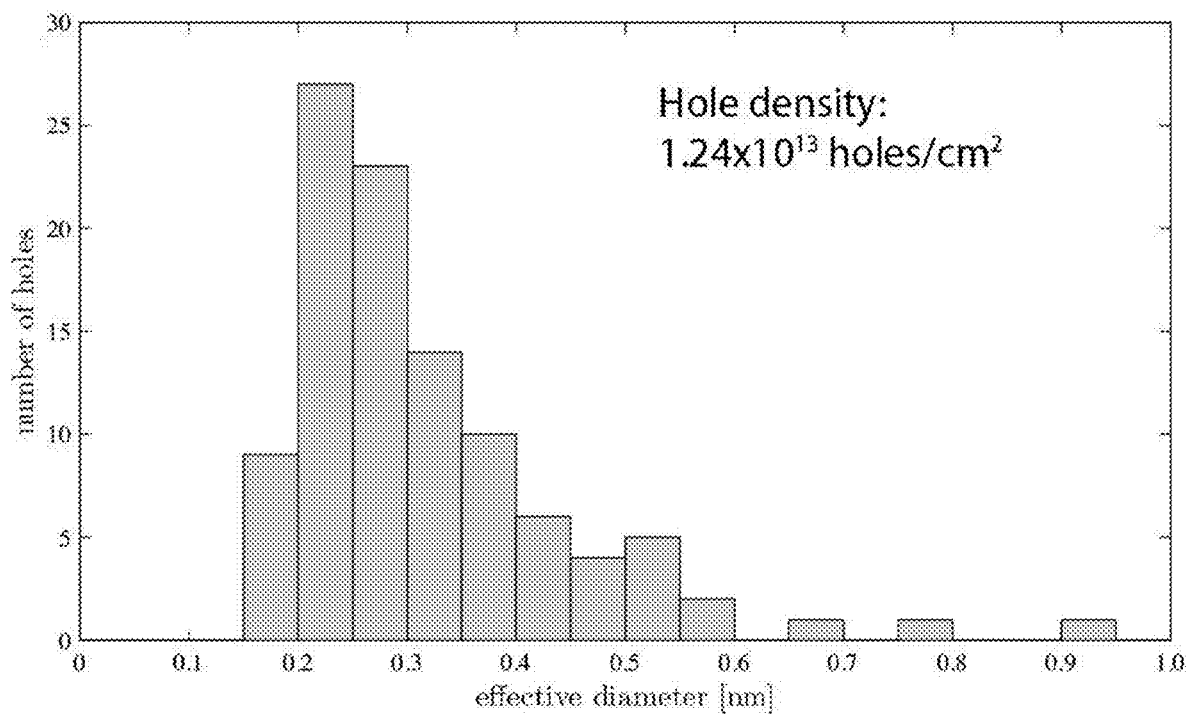
FIG. 9A is a graph of the pore size distribution in bombarded and oxidized graphene.
Figure 9B:
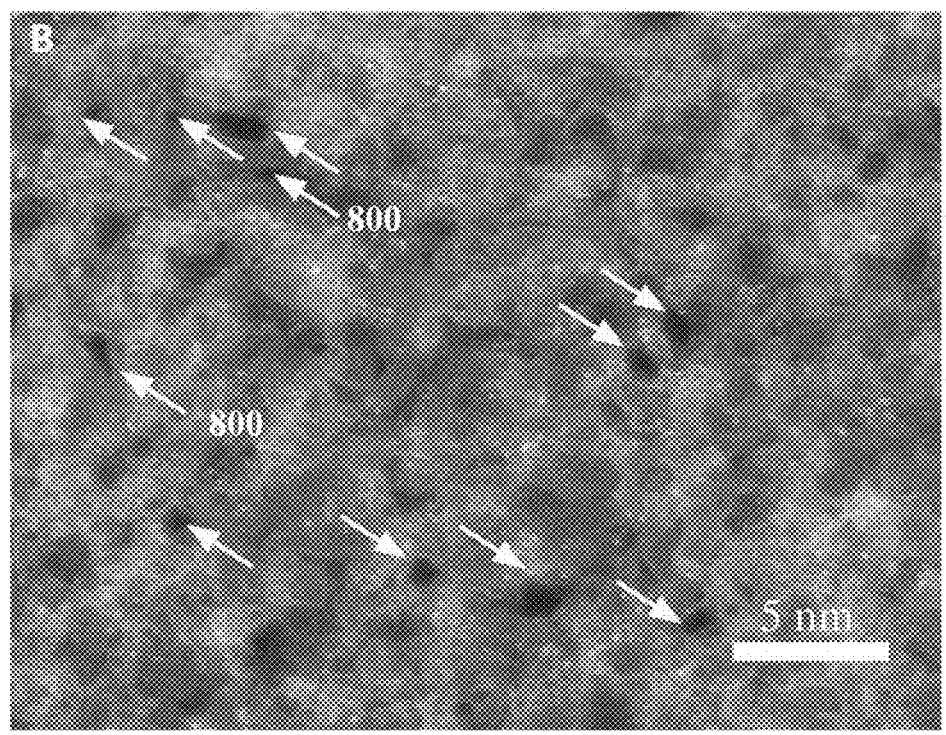
FIG. 9B is an image of pores, indicated by the arrows, generated in the graphene lattice through ion bombardment followed by oxidation.

To demonstrate this effect, a graphene sample was irradiated with gallium ions in a Helios Nanolab DualBeam 600 at 1 kV potential and a density of ~$10^{13}$ ions/cm$^2$, then the sample was etched in an ammonium persulfate solution (APS-100) for 5 h. To assess the effect of the bombardment and etching, the sample was imaged in a Nion UltraSTEM 200 to image pores 800, see FIG. 9B. The distribution of effective pore diameters observed is presented in FIG. 9A. It was found that the ion bombarded and etched graphene had a pore density of about 1.1% with an average pore size of about 0.32 nm.

Example: Nucleation and Growth

Figure 10A:
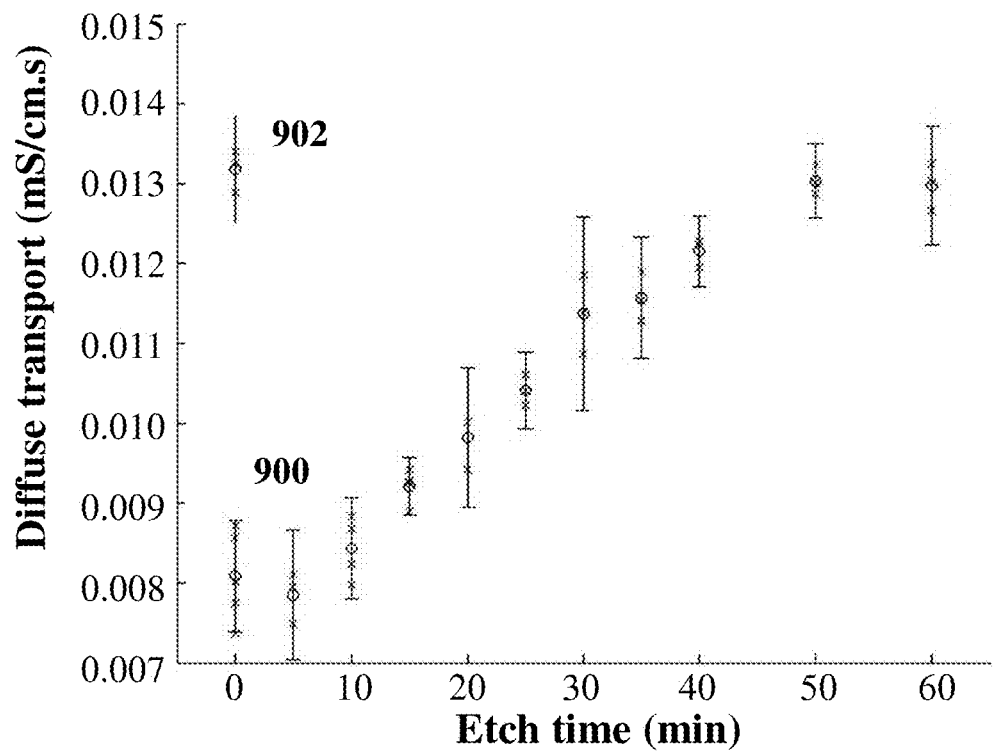
FIG. 10A is a graph of the measured diffusive transport of a graphene layer exposed to ion bombardment versus etch time.
Figure 10B:
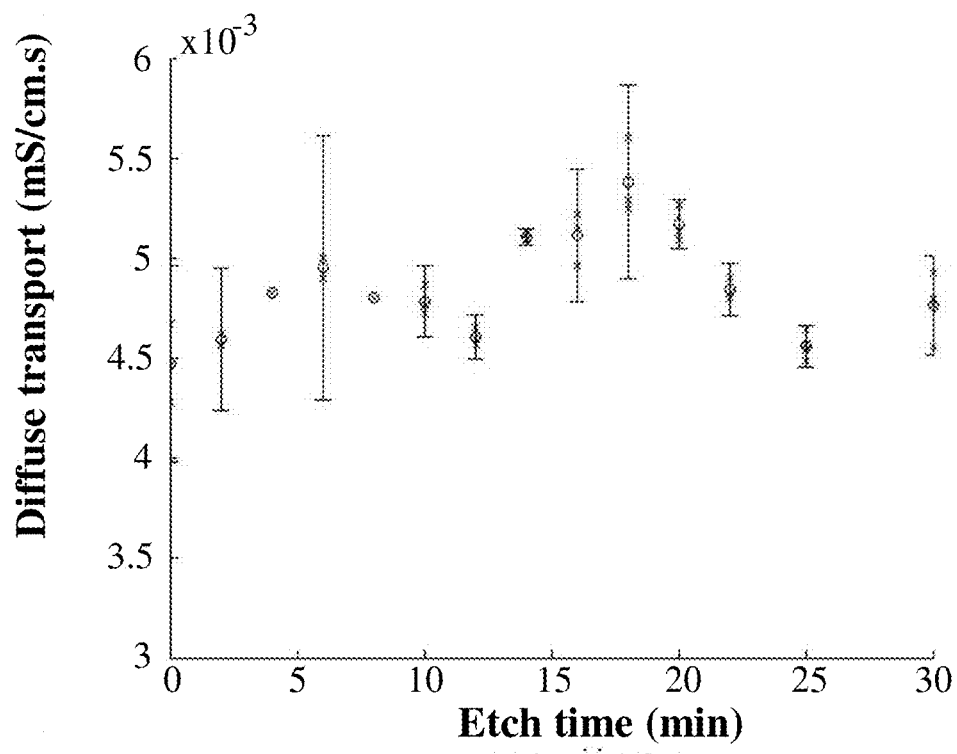
FIG. 10B is a graph of the measured diffusive transport of a graphene layer without ion department versus etch time.

FIGS. 10A and 10B present comparative results for the diffusive transport of HCl through graphene membranes as a function of etching time for graphene layers that have been subjected to ion bombardment and graphene layers that have not been subjected to ion bombardment. FIG. 10A presents the diffusive transport for a single graphene layer that has been bombarded with ions 900 versus etch time as well as a bare polycarbonate membrane 902 included for comparative purposes. The single graphene layer was grown using chemical vapor deposition and was placed on a polycarbonate membrane. Prior to testing, the graphene layer was bombarded with gallium ions in a Helios Nanolab DualBeam 600 with a voltage of 8 kV, $10^{13}$ ions/cm$^2$, and an angle of incidence of 52°. The membrane was then mounted in a flow cell similar to that noted above in FIG. 5D to measure the transport properties prior to etching as compared to the as formed graphene layer. After initial characterization, the membrane was exposed to a mixture of sulfuric acid and potassium permanganate (12.5% $H_2SO_4$ and 3.75 mM $KMnO_4$ mixed 1:1 by volume), followed by measurement of the transport properties. This etching and measurement process was carried out alternately to obtain the transport properties of the membranes as a function of etch time. As illustrated by FIG. 10A, the diffusive transport of HCl increased as a function of etch time and plateaued at longer times. This plateaued value was similar to the support polycarbonate membrane 902 without graphene. Without wishing to be bound by theory, the observed plateau is believed to correspond to the graphene having become permeable to HCl.

In contrast to the above, when the same experiment was performed without ion bombardment of the graphene layer, no statistically significant change in the diffusive transport of HCl was observed, see FIG. 10B. Without wishing to be bound by theory, this behavior is believed to be due to the absence of a large number of defects present in the graphene layer as was the case for the ion bombarded graphene layer above.

Figure 10C:
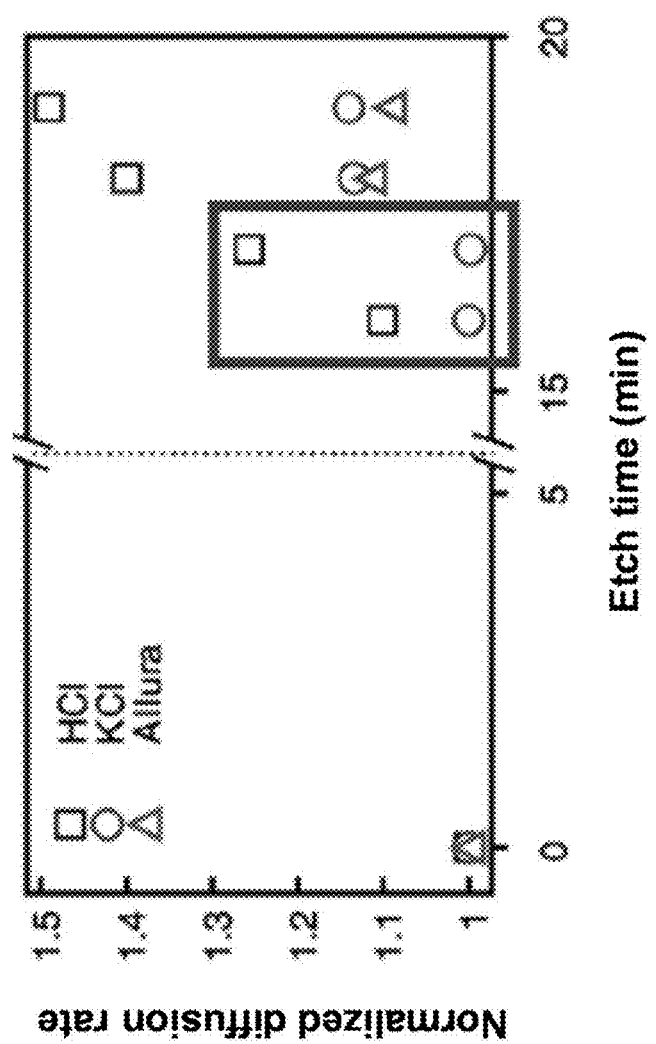
FIG. 10C is a graph of the normalized diffusion rates of different salts across a graphene layer exposed to ion bombardment versus etch time.

FIG. 10C presents the transport rates of HCl, KCl and Allura Red dye as a function of etch time after ion bombardment as described above in reference to FIG. 10A. The transport rate of each salt is normalized by its value before etching of the graphene. It is seen that initially, there was no increase in transport of any of the salts. After a certain etch time, the transport of HCl increased, while that of KCl and Allura Red dye remained relatively unchanged. Without wishing to be bound by theory, this result is believed to be due to the controlled growth of pores during the chemical etch, and also that this controlled growth of the pores can lead to selective transport through the membrane, presumably because the pores allow H$^+$ ions to go through, which then also bring along Cl$^-$ ions through defects or uncovered pores by setting up a membrane potential.

In view of the above, and without wishing to be bound by theory, ion bombardment induces defects in a graphene layer that may be selectively etched to provide pores of a desired size within one or more graphene layers. However, any appropriate method capable of inducing defects in the one or more graphene layers might be used. For example, plasma (where defects may be induced chemically or through bombardment of the graphene with ions), UV-ozone treatment, or other appropriate methods may be used to induce the desired defects in the one or more graphene layers. Further, the process of etching the one or more graphene layers to control the pore size may be carried out with any chemical that preferentially etches graphene at defects and edges to controllably increase the pore sizes.

Example: Membrane Flow Model

FIGS. 11A-11C schematically illustrate the different types of flow that may occur through a membrane including a first graphene layer 1000, a second graphene layer 1002, and a porous substrate 1004. Assuming that a large species 1006 and a small species 1008 are provided on one side of the membrane, the arrangements of the pores within the various layers of the membrane affects the selectivity and flow of the two species through the membrane. For example, in a bare region 1010 of the membrane, defects in both the graphene layers 1000 and 1002 are aligned with a pore in the porous substrate 1004. Consequently, both the small and large species 1006 and 1008 are free to flow through the pores of the substrate subject only to the flow resistance of the substrate itself. Similarly, there may be a defect in one graphene layer on a portion of the substrate not covered by the other graphene layer as depicted at 1012. Thus, both the large and small species 1006 and 1008 might still be able to flow through this portion of the membrane, but would be subject to the flow resistance of both the substrate and the defect resistance in the single graphene layer. At 1014, defects in both the first and second graphene layers 1000 and 1002 are aligned with each other and a pore of the porous substrate 1004 which may again permit the flow of both species through the membrane. However, the flow of the species through this portion of the substrate would be subject to the flow resistance of the substrate and the defects in both graphene layers.

In contrast to the above non-selective defects, and as depicted in FIG. 11C, the membrane may also include portions 1016 that include intentionally formed pores 1018 in both the first and second graphene layers 1000 and 1002 which are aligned with a corresponding pore of the substrate 1004. The pores may be sized to provide selectivity between the larger species 1006 and the smaller species 1008 as depicted in figure. In such a location, the resistance to flow would be a combination of the resistance of the selective pores in both graphene layers as well as the resistance of the substrate. It should be noted, that a selective pore may also be formed in a portion of the membrane covered only by a single graphene layer, not depicted. The resistance to flow in such a location would be a combination of the resistance of the selective pore through a single graphene layer and the resistance of the substrate in addition to excluding the larger species 1006.

Figure 11D:
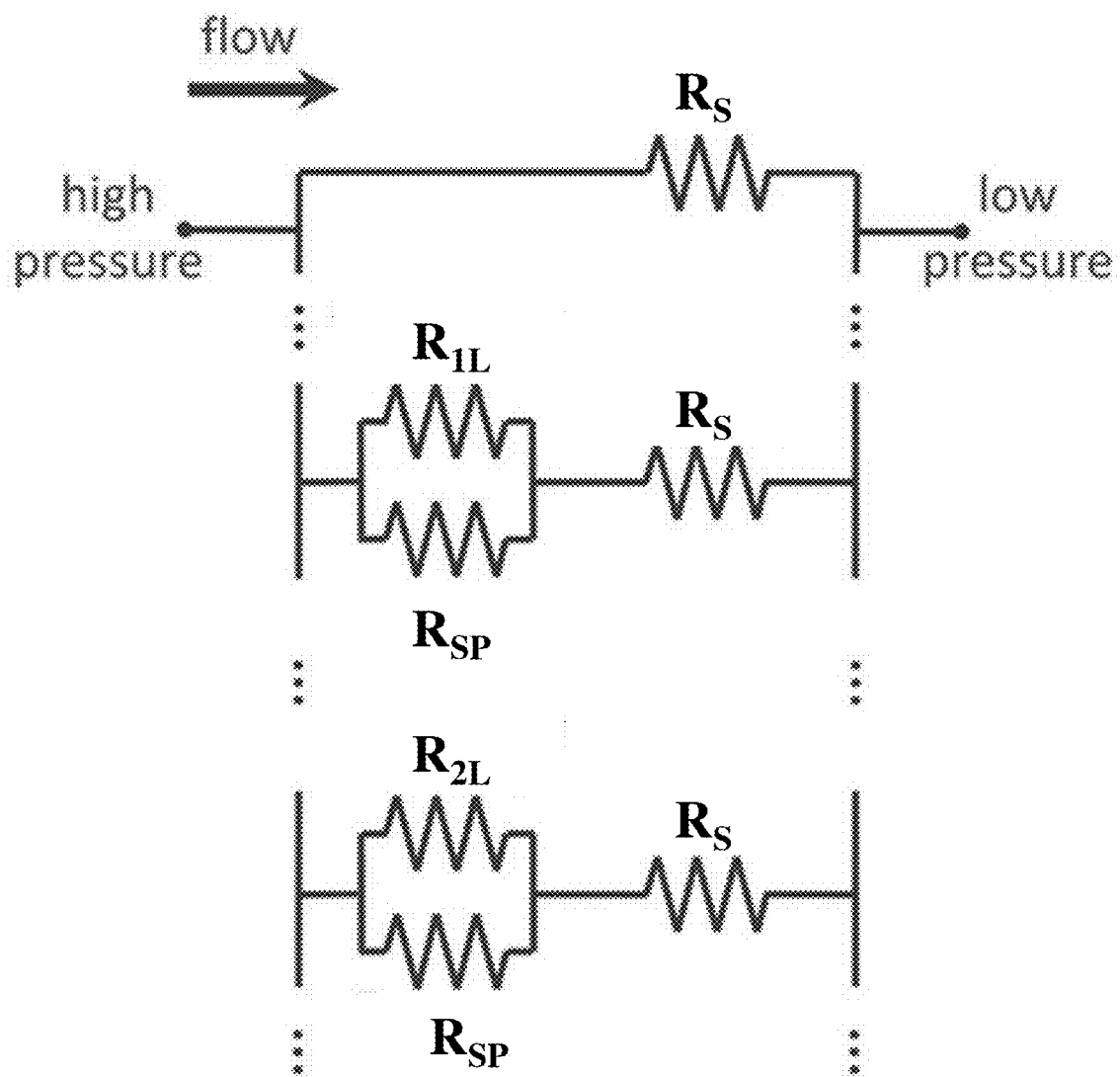
FIG. 11D is a schematic representation of a flow model.

A representative model of the flow resistances present within the membrane is depicted in FIG. 11D. The model includes parallel resistances of the uncovered portions of the substrate, portions of the substrate covered by a single graphene layer, and portions of the substrate covered by two graphene layers. It should be understood, that the model could be extended to any number of graphene layers and that two graphene layers are depicted for illustrative purposes only. The flow resistance associated with uncovered portions of the substrate is represented by $R_S$ which is the resistance to flow through the bare substrate. The resistance to flow for portions of the substrate covered by a single graphene layer is depicted by a parallel combination of resistances $R_{1L}$ corresponding to the resistance to flow of the graphene layer (including non-selective pores) and $R_{SP}$ corresponding to the resistance to flow of the selective pores formed in the graphene layer. $R_{1L}$ and $R_{SP}$ are in parallel with each other but arranged in series with the substrate resistance $R_S$ to model the entire flow through the portions of the membrane including a single graphene layer on top of the substrate. Similarly, the resistance to flow for portions of the substrate covered by two graphene layers is depicted by a parallel combination of resistances $R_{2L}$ corresponding to the resistance to flow of the two stacked graphene layers and $R_{SP}$ corresponding to the resistance to flow of the selective pores formed in the graphene layers in series with the substrate resistance $R_S$. Without wishing to be bound by theory, the parallel arrangement of the substrate resistance relative to the resistances of the portions of the membrane covered by the graphene layers helps to illustrate why it may be beneficial to match the resistances of the substrate and graphene layers as described above. As described in more detail in the following examples, the above model is used to model the flow through one or more graphene sheets associated with substrates with varying pore sizes to illustrate the effect of substrate pore size on selectivity of the resulting filter even when the graphene has non-selective defects present therein.

In view of the above, the support substrate can be used to help minimize leaks through undesired non-selective defects in graphene. For the case of diffusive transport, the resistance to diffusion through polycarbonate is similar (within a factor of 10) to the resistance to diffusion through graphene. Therefore, the polycarbonate membrane may serve to control excessive leaks and may also provide selectivity. For pressure-driven flow it may be desirable for the resistance of the support structure to substantially match the resistance of the graphene layer(s). At the same time, to isolate the effect of undesired defects, the porous support may have isolated pores with sizes smaller than the sizes of the undesired defects, or have a thin high-resistance layer with a thickness smaller than the size of the undesired defects. If that is not possible, the isolated pore size of the thin layer may alternatively be smaller than the mean distance between defects, though other embodiments might also be possible.

Example: Flow Simulations

Figure 13:
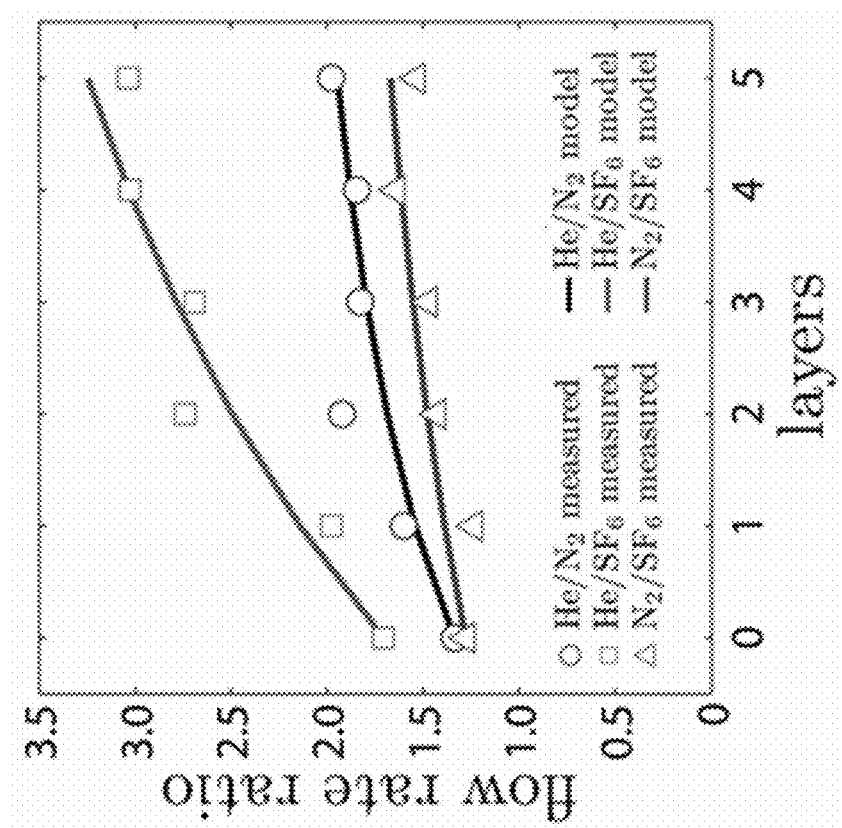
FIG. 13 is a graph presenting the flow rate ratios of different gases versus the number of graphene layers.
Figure 12:
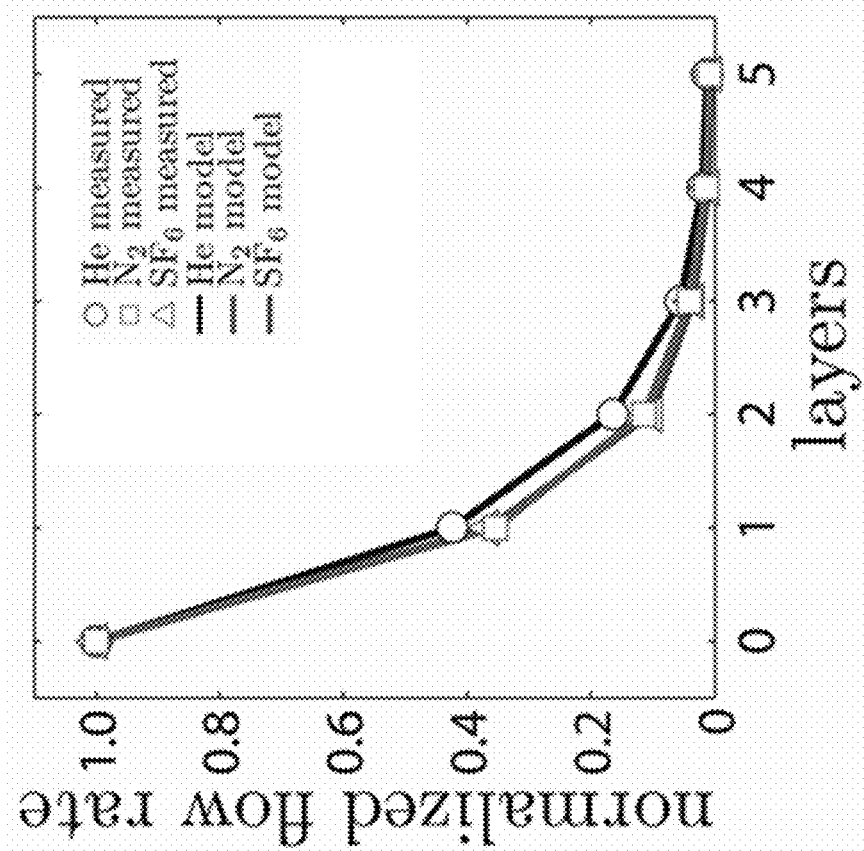
FIG. 12 is a graph presenting measured and predicted flow rates of different gases versus the number of graphene layers.

A simulation of the transport of helium gas, nitrogen gas, and sulfur hexafluoride through graphene on a porous polycarbonate support was performed and compared to measured data points, see FIGS. 12 and 13. For the simulations, the flow rate of the gases through polycarbonate was measured, while the flow rate though graphene was calculated using Monte Carlo simulations. Intrinsic pores in the graphene were simulated based on the data obtained by STEM shown in FIGS. 6A-6G. Note that these pores are non-selective. The graphene was assumed to cover a certain fraction of the polycarbonate support. Overlapping graphene layers resulted in covering of pores either with graphene or with another pore. Next, molecules were randomly bombarded on the graphene sample and assumed to pass through if their center was within the pore area (minus their kinetic radius). Knowing the ideal gas flux and polycarbonate pore resistance, the flow rate of each gas was calculated. Next, the graphene was assumed to have uniformly distributed selective pores that resulted in some permeability. This permeability depends on pore density and transport through the pores, and was varied as a parameter of the simulation. Selectivity of helium and sulfur hexafluoride was calculated assuming that the sulfur hexafluoride flow through the selective pores is 15,000 times less than helium. FIGS. 12 and 13 show the results of the simulation for various numbers of independently stacked graphene layers.

A similar simulation was performed for FIGS. 14A-14D assuming 70% graphene coverage with a substrate with 1 μm pores. FIGS. 15A-15D also present a similar simulation assuming 90% graphene coverage with a substrate with 10 nm pores. The above simulations were conducted for stacks of graphing layers with varying amounts of flow resistance ranging from 1 times to 10,000 times the resistance of a PCTEM substrate. A selective pore resistance (inverse of permeability) of $10^{22}$ mol/Pa·s per pore and pore density of $10^{12}$ cm$^{-2}$ was assumed. As illustrated by the graphs, the 1 pin support pore size yielded little selectivity as compared to the other simulation, and only provided some selectivity as the resistance of the polycarbonate support was substantially increased to more closely match the resistance of the graphene (with only selective pores). Without wishing to be bound by theory, this is because a 1 μm pore size is too big to laterally isolate the effects of the defects because their diameter is larger than the spacing between the defects. In effect, the defects and selective pores are in parallel to each other and in series with the polycarbonate pore. In contrast, the 10 nm polycarbonate support pores, had improved selectivity as seen for higher polycarbonate support resistances. Again, without wishing to be bound by theory, this is because the 10 nm pore size is small enough that it laterally isolates the defects, i.e. the defects are in series with polycarbonate pores, which are in parallel with selective pores in series with polycarbonate pores. Consequently, the presented results show that better selectivity is obtained using 10 nm polycarbonate pores, with more layers of graphene, and with certain resistance to flow of the polycarbonate support. While the substrate including 1 nm pores performed better relative to the substrate including 1 μm pore size, embodiments including a substrate with any appropriately sized pore, including 1 μm sized pores, might be used.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A filtration membrane comprising:
a porous substrate;
at least one active layer comprising a sheet of atomically thin material, wherein the at least one active layer is disposed on the porous substrate, and wherein the at least one active layer comprises a plurality of defects; and
a first plurality of pores passing from one side of the at least one active layer to an opposing side of the at least one active layer, wherein the porous substrate laterally isolates flow through the at least one active layer, and wherein a pore size of the porous substrate is less than a mean distance between defects of the at least one active layer.

2. The filtration membrane of claim 1, wherein the at least one active layer comprises at least one of graphene, graphene oxide, hexagonal boron nitride, molybdenum sulfide, and vanadium pentoxide.

3. The filtration membrane of claim 1, wherein a flow resistance of the porous substrate is less than approximately ten times a flow resistance of the at least one active layer.

4. The filtration membrane of claim 3, wherein the flow resistance of the porous substrate is greater than approximately 0.0001 times the flow resistance of the at least one active layer.

5. The filtration membrane of claim 3, wherein the flow resistance of the porous substrate is greater than approximately 0.05 times the flow resistance of the at least one active layer.

6. The filtration membrane of claim 3, wherein the flow resistance of the porous substrate is less than approximately one times the flow resistance of the at least one active layer.

7. The filtration membrane of claim 1 wherein the first plurality of pores are sized to provide selectivity relative to a desired liquid or gas.

8. The filtration membrane of claim 1 wherein the porous substrate comprises at least one of a polymer, a ceramic, and a metal.

9. The filtration membrane of claim 1, wherein the porous substrate comprises a second filtration membrane.

10. The filtration membrane of claim 9, wherein the second filtration membrane is selected from the group consisting of a nanofiltration membrane, a reverse osmosis membrane, an ultrafiltration membrane, and a brackish water filtration membrane.

11. The filtration membrane of claim 1, wherein the at least one active layer is functionalized.

12. The filtration membrane of claim 11, wherein the at least one active layer is functionalized with at least one of a polymer, a chelating agent, and a macrocycle.

13. A filtration membrane comprising:
a porous substrate;
a first active layer comprising a sheet of atomically thin material, wherein the first active layer comprises a first plurality of defects, and wherein the first active layer is disposed on the porous substrate;
a second active layer comprising a sheet of atomically thin material, wherein the second active layer comprises a second plurality of defects, and wherein the second active layer is disposed on the first active layer; and
a plurality of selective pores formed in the first and second active layers, wherein the plurality of selective pores pass from one side of the first and second active layers to an opposing side of the first and second active layers such that selective pores formed in the first and second active layers are aligned, wherein a majority of the first plurality of defects and the second plurality of defects are misaligned, and wherein a majority of the plurality of selective pores formed in the first and second active layers are aligned.

14. The filtration membrane of claim 13, wherein the first active layer and the second active layer comprise at least one of graphene, graphene oxide, hexagonal boron nitride, molybdenum sulfide, and vanadium pentoxide.

15. The filtration membrane of claim 13, wherein the second active layer covers the first plurality of defects present in the first active layer.

16. The filtration membrane of claim 13, wherein the plurality of selective pores are sized to provide selectivity relative to a desired liquid or gas.

17. The filtration membrane of claim 13, wherein the porous substrate comprises at least one of a polymer, a ceramic, and a metal.

18. The filtration membrane of claim 13, wherein the porous substrate comprises a second filtration membrane.

19. The filtration membrane of claim 18, wherein the second filtration membrane is selected from the group consisting of a nanofiltration membrane, a reverse osmosis membrane, an ultrafiltration membrane, and a brackish water filtration membrane.

20. The filtration membrane of claim 13, wherein the first and/or second active layer is functionalized.

21. The filtration membrane of claim 20, wherein the first and/or second active layer is functionalized with at least one of a polymer, a chelating agent, and a macrocycle.

22. The filtration membrane of claim 13, wherein an $H_2$ permeability of the first and second active layers is greater than approximately $10^{-6}$ mol/m2-s-Pa.

23. The filtration membrane of claim 20, wherein the plurality of selective pores of the first and/or second active layers are functionalized.

24. The filtration membrane of claim 13, further comprising a protective coating applied to at least one of the first and second active layer.

25. The filtration membrane of claim 13, wherein the porous substrate laterally isolates flow through the first active layer and the second active layer.

26. The filtration membrane of claim 13, wherein the porous substrate laterally isolates flow through a defect formed in at least one of the first active layer and the second active layer from flow through the aligned pores formed in the first active layer and the second active layer.

27. The filtration membrane of claim 1, wherein an $H_2$ permeability of the at least one active layer is greater than approximately $10^{-6}$ mol/m$^2$-s-Pa.

28. The filtration membrane of claim 1, wherein the first plurality of pores of the at least one active layer are functionalized.

29. The filtration membrane of claim 1, further comprising a protective coating applied to the at least one active layer.

30. The filtration membrane of claim 1, wherein the porous substrate laterally isolates flow through a defect formed in the at least one active layer from flow through the first plurality of pores formed in the at least one active layer.

31. The filtration membrane of claim 1, wherein the at least one active layer is a stack of a plurality of separate active layers, and wherein the first plurality of pores pass from one side of the stack to an opposing side of the stack such that the first plurality of pores formed in the different active layers are aligned.

32. The filtration membrane of claim 1, wherein the first plurality of pores are angstrom-scale or nanometer-scale pores.

33. The filtration membrane of claim 1, wherein the first plurality of pores have diameters between 1 nm and 15 nm.

34. The filtration membrane of claim 13, wherein the plurality of selective pores are angstrom-scale or nanometer-scale pores.

35. The filtration membrane of claim 13, wherein the plurality of selective pores have diameters between 1 nm and 15 nm.

36. The filtration membrane of claim 25, wherein the porous substrate comprises pores, and wherein the pores of the porous substrate are straight and extend in a direction away from the first active layer adjacent the porous substrate.

37. The filtration membrane of claim 36, wherein the porous substrate comprises pores with diameters in the range of 1 nm to 10 microns.

38. The filtration membrane of claim 36, wherein a pore size of the porous substrate is less than a mean distance between defects of the first active layer and the second active layer.

39. The filtration membrane of claim 1, wherein the porous substrate comprises a second plurality of isolated pores that are fluidly coupled to the first plurality of pores.

40. The filtration membrane of claim 1, wherein the porous substrate comprises a second plurality of pores, wherein the second plurality of pores are cylindrical, conical, or bullet shaped.

41. The filtration membrane of claim 13, wherein a flow resistance of the porous substrate is less than approximately ten times a combined flow resistance of the first and second active layers.

42. The filtration membrane of claim 1, wherein a pore size of the first plurality of pores is less than a size of the defects.

43. The filtration membrane of claim 13, wherein substantially all of the plurality of selective pores formed in the first and second active layers are aligned.

44. The filtration membrane of claim 1, wherein the porous substrate laterally isolates flow through the at least one active layer by reducing flow in a direction substantially perpendicular to a direction of flow across the porous support.

* * * * *